United States Patent
Okamoto

(10) Patent No.: US 7,684,926 B2
(45) Date of Patent: Mar. 23, 2010

(54) ELECTRONIC CONTROL APPARATUS HAVING FIRST MICROCOMPUTER WHICH FORWARDS EXTERNALLY SUPPLIED UPDATING DATA TO A SECOND MICROCOMPUTER HAVING A LOWER DATA RECEIVING PERFORMANCE THAN THE FIRST MICROCOMPUTER

(75) Inventor: Kazuya Okamoto, Kariya (JP)

(73) Assignee: DENSO Corporation, Kariya (JP)

( * ) Notice: Subject to any disclaimer, the term of this patent is extended or adjusted under 35 U.S.C. 154(b) by 1036 days.

(21) Appl. No.: 11/385,697

(22) Filed: Mar. 22, 2006

(65) Prior Publication Data

US 2006/0227606 A1 Oct. 12, 2006

(30) Foreign Application Priority Data

Mar. 22, 2005 (JP) .............................. 2005-081661

(51) Int. Cl.
*G06F 19/00* (2006.01)
*G06G 7/70* (2006.01)
*G06F 15/167* (2006.01)
*G06F 15/16* (2006.01)

(52) U.S. Cl. ........................ 701/115; 709/213; 709/214; 709/215; 709/216; 709/237; 709/250

(58) Field of Classification Search ................. 709/250; 701/115
See application file for complete search history.

(56) References Cited

U.S. PATENT DOCUMENTS

| 5,481,906 | A | 1/1996 | Nagayoshi et al. |
| 5,826,211 | A | 10/1998 | Kobayashi |
| 6,104,971 | A | 8/2000 | Fackler |
| 6,678,586 | B2 | 1/2004 | Nakamoto et al. |
| 2001/0002814 | A1* | 6/2001 | Suganuma et al. ......... 340/5.74 |
| 2003/0088358 | A1* | 5/2003 | Takeuchi .................... 701/114 |
| 2004/0002793 | A1* | 1/2004 | Tachibana et al. .............. 701/1 |

FOREIGN PATENT DOCUMENTS

| JP | H06-035851 | 2/1994 |
| JP | H07-069093 | 3/1995 |
| JP | H09-160766 | 6/1997 |
| JP | H11-508716 | 7/1999 |
| JP | 2001-067215 | 3/2001 |
| JP | 2002-108835 | 4/2002 |
| JP | 2005-025519 | 1/2005 |

OTHER PUBLICATIONS

Japanese Office Action dated Dec. 16, 2008 issued in corresponding Japanese Application No. 2005-081661, with English translation.

* cited by examiner

*Primary Examiner*—Vivek Srivastava
*Assistant Examiner*—Lin Liu
(74) *Attorney, Agent, or Firm*—Nixon & Vanderhye P.C.

(57) ABSTRACT

An electronic control apparatus such as an ECU of a motor vehicle contains first and second microcomputers, with the first microcomputer having a substantially higher data receiving performance than the second microcomputer. Data for updating a ROM of the second microcomputer, transmitted to the first microcomputer from an external apparatus at a relatively high data rate, are temporarily stored in RAM by the first microcomputer and then transmitted to the second microcomputer at a rate which is appropriate for the receiving performance of the second microcomputer.

6 Claims, 16 Drawing Sheets

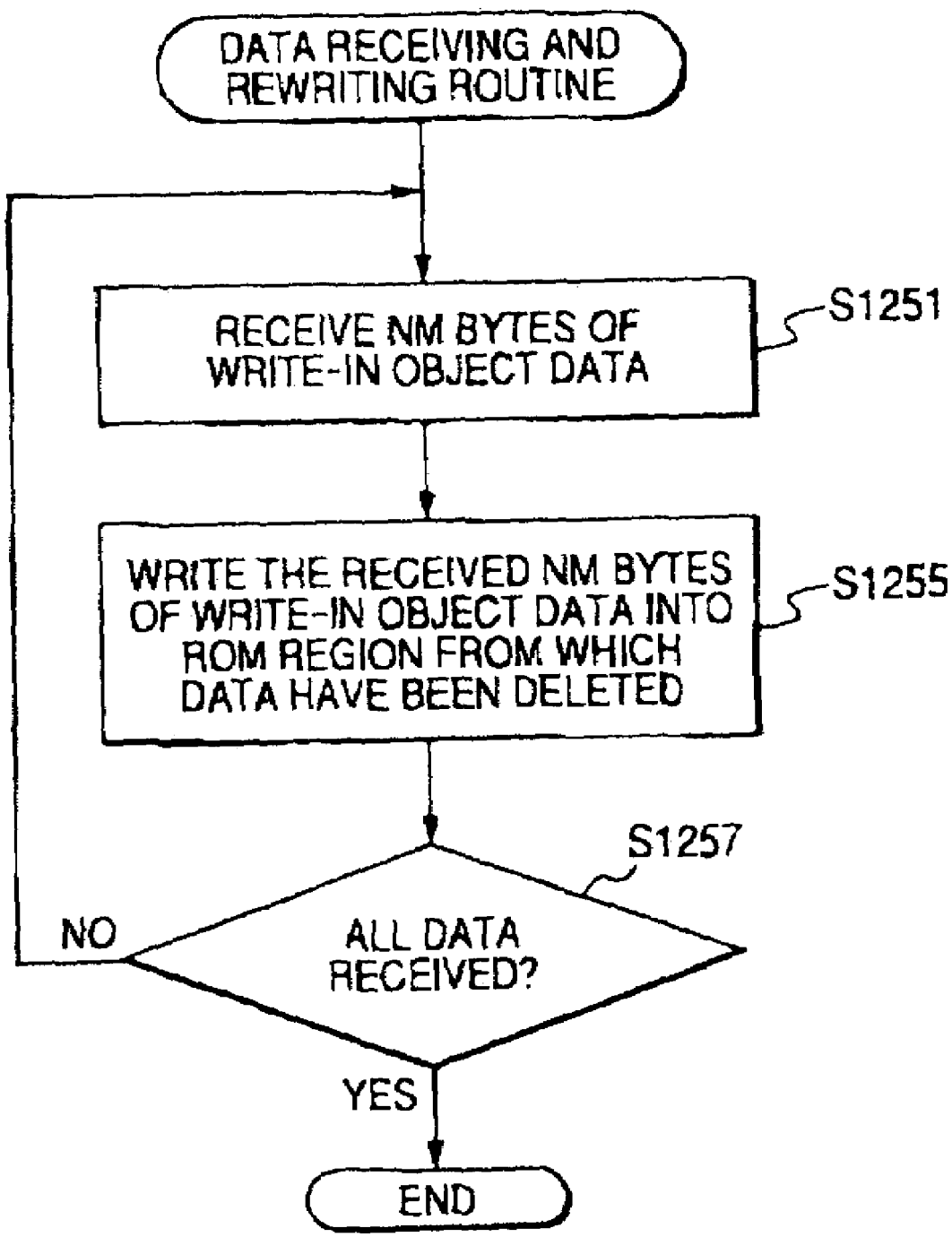

ELECTRONIC CONTROL APPARATUS HAVING FIRST MICROCOMPUTER WHICH FORWARDS EXTERNALLY SUPPLIED UPDATING DATA TO A SECOND MICROCOMPUTER HAVING A LOWER DATA RECEIVING PERFORMANCE THAN THE FIRST MICROCOMPUTER

CROSS-REFERENCE TO RELATED APPLICATIONS

This application is based on and incorporates herein by reference Japanese Patent Application No. 2005-081661 filed on Mar. 22, 2005.

BACKGROUND OF THE INVENTION

1. Field of Application

The present invention relates to an electronic control apparatus such as an ECU (electronic control unit) used in a vehicle, that includes a plurality of microcomputers each equipped with a rewritable type of non-volatile memory, and in which each microcomputer can update data stored its non-volatile memory by writing externally supplied data into the memory.

2. Description of Related Art

Types of ECU are known, for controlling various equipment of a motor vehicle, which are made up of a plurality of microcomputers. Such a type of ECU is described for example in Japanese patent publication No. 9-160766.

Each microcomputer of such an ECU includes a rewritable type of non-volatile memory, for storing programs and control data. Data (i.e., constituting a program and/or control data) can be supplied to such a microcomputer, to be written into the non-volatile memory and thereby updating the memory contents. Generally the plurality of microcomputers are successively connected in series by internal communication lines, with one of the microcomputers also being connected to an external communication line, for transferring data and memory address information to a microcomputer of the ECU from an apparatus that constitutes a data source external to the ECU). For example, in the case of an ECU having two microcomputers, when data are to be supplied (for updating the contents of a non-volatile memory) from the external apparatus to the microcomputer which is not connected to the external communication line, then the microcomputer which is connected to the external communication line receives the data and forwards the data via an internal communication line to the other microcomputer.

In addition, as described for example in Japanese patent publication No. 7-069093, types of electronic control apparatus are known in which a first microcomputer that is connected to an external communication line (as defined above) and is connected to a second microcomputer via an internal communication line, converts signals that are received via the internal communication line from the second microcomputer into a protocol that is appropriate for an external apparatus, and transmits the converted signals via the external communication line to the external apparatus.

However in the case of an ECU such as is described in Japanese patent publication No. 9-160766 there is the following disadvantage. When data for memory updating are transmitted via an external communication line from an external apparatus, and the data are to be written into the non-volatile memory of a destination microcomputer which is not connected to the external communication line, it is necessary for that destination microcomputer to be capable of receiving data at the transmission rate of the external apparatus.

That is to say, with such a type of ECU, even if a microcomputer is connected only to one or more other microcomputers within the ECU, it is necessary for it to have the same high level of performance (i.e., data receiving processing performance) as a microcomputer that is connected to an external communication line and so receives data transmitted directly at a high data rate from an external (data source) apparatus.

Thus, although (if the communication protocol used by the destination microcomputer differs from that of the external apparatus) protocol conversion can be performed to enable data communication between the external apparatus and the destination microcomputer that is not connected to the external communication line, such communication will still be impossible if the data receiving processing performance of that destination microcomputer is insufficient. That is to say, the microcomputer which is connected to the external communication line will transfer the incoming data, from the external apparatus, to the destination microcomputer at the same rate as the data are transmitted from the external apparatus. Hence, if the data receiving processing performance of that destination microcomputer is insufficient, then overflow will occur in the transfer of data within the ECU.

For that reason, it has been necessary to use microcomputers which have the same high level of data receiving processing performance, both as a microcomputer that directly receives data from an external apparatus, and also as each of one or more other microcomputers which receive data only indirectly (i.e., by transfer within the ECU) from the external apparatus.

The terminal "receiving processing performance" is used here with the basic significance of "maximum rate at which data can be received by the microcomputer, without occurrence of data overflow".

Hence it has been necessary for all of the microcomputers of such an ECU to be of an expensive type, even if transfer of data at a high rate (between microcomputers within the ECU) will only occur on the occasions when non-volatile memory contents are updated.

SUMMARY OF THE INVENTION

It is therefore an objective of the present invention to provide an electronic control apparatus such as an ECU of a motor vehicle, having a single microcomputer which has a relatively high level of data receiving processing performance and is directly coupled for communication with an external apparatus, and one or more microcomputers each including a non-volatile memory and having a relatively low level of data receiving processing performance, which perform communication only within the ECU, but whose non-volatile memory contents can be updated by data supplied from the external apparatus.

To achieve the above objective, according to a first aspect the invention provides an electronic control apparatus, such as an ECU of a vehicle, having a first microcomputer and second microcomputer, each having an internally disposed rewritable type of non-volatile memory (i.e., ROM) and internally disposed communication circuit means coupled to communication line means. Each of the first microcomputer and second microcomputer performs processing based upon data (i.e., including programs) that are held stored in the corresponding non-volatile memory, and each can receive data (directed to that specific microcomputer) via its communication circuit means, and write the data into its non-volatile memory to thereby update the memory contents. With the present invention, such an electronic control apparatus is characterized in that the communication circuit means of the first microcomputer comprises a first communication circuit that is connected via a first communication line to an external apparatus, and a second communication circuit that is connected via a second communication line to the second microcomputer, and in that the communication circuit means of the second microcomputer comprises a communication circuit coupled to the second communication line. In addition, the first microcomputer comprises data forwarding means, for forwarding to the second microcomputer data that have the second microcomputer as destination and are received by the first microcomputer from the external apparatus. The data forwarding means includes a volatile memory (i.e., RAM) and storage control means for storing, in the volatile memory, data that are received via the first communication circuit and second communication circuit.

With such an electronic control apparatus, when the first microcomputer receives write-in object data from the external apparatus that are directed to the second microcomputer, and stores the write-in object data in its volatile memory, the first microcomputer subsequently forwards the write-in object data via its second communication circuit and the second communication line, to the communication circuit of the second microcomputer. The first microcomputer executes the forwarding of the write-in object data in accordance with the data receiving capability of the second microcomputer (as defined hereinabove).

In that way, the first microcomputer can receive data that are directed to the second microcomputer (i.e., to be written into the non-volatile memory of the second microcomputer, with such data being referred to herein as write-in object data) but are transmitted at a high data rate from the external apparatus, and the first microcomputer can subsequently transfer the data to the second microcomputer at a rate that is appropriate for the second microcomputer. Hence, the performance requirements for the second microcomputer can be relaxed, so that a more inexpensive type of microcomputer can be used as the second microcomputer, by comparison with the first microcomputer.

In order to achieve such transfer of data to the second microcomputer at a rate that is appropriate for the second microcomputer, the first microcomputer preferably divides the received write-in object data (after temporarily storing the data in its volatile memory) into a plurality of data blocks of suitable size, and successively transmits these to the second microcomputer. The maximum size for each of the data blocks is predetermined based upon the data receiving processing capability of the second microcomputer.

Moreover preferably, the second microcomputer transmits a handshake signal to the first microcomputer each time that the second microcomputer reaches a condition in which it is ready to receive another data block, and the first microcomputer successively transmits the data blocks in response to successive occurrences of the handshake signal.

From another aspect, the first microcomputer preferably comprises data conversion means for operating on write-in object data (transmitted from an external apparatus to the first microcomputer) that are directed to the second microcomputer, to convert the write-in object data into suitable form for being handled by the second microcomputer, and forwards resultant converted write-in object data to the second microcomputer.

In that way it becomes unnecessary to provide the second microcomputer with means for performing such data conversion, thereby further ensuring that a low-cost type of microcomputer can be utilized as the second microcomputer.

Such write-in object data will generally be sent to the first microcomputer, from the external apparatus, together with address information which specifies the addresses (in a non-volatile memory of the first microcomputer or second microcomputer) into which the data are to be written. With the present invention, when such write-in data are directed to the second microcomputer, the first microcomputer also transmits the corresponding address information (i.e., received from the external apparatus by the first microcomputer) to the second microcomputer.

From another aspect, the first microcomputer of such an electronic control apparatus preferably includes means for acquiring from the second microcomputer, via the aforementioned second communication line, data that have been previously received by the second microcomputer as write-in object data, and also comparator means for comparing the data thus acquired from the second microcomputer with corresponding data received from the external apparatus (i.e., data which should be identical to the write-in object data previously received by the second microcomputer). In that case the first microcomputer compares these two sets of data (e.g. one byte at a time), and thereby detects any error that has occurred in forwarding the write-in object data from the first to the second microcomputer, since such an error will result in a mismatch between the two sets of data.

The external apparatus can thereby be notified of the occurrence of such data transfer errors, and the process of forwarding write-in data to the second microcomputer (and writing the data into the non-volatile memory of that microcomputer) can then be repeated. The reliability and accuracy of updating the contents of the non-volatile memory of the second microcomputer can thereby be enhanced.

From another aspect, such an electronic control apparatus is preferably configured such that the first microcomputer is responsive to receiving a transfer status notification command transmitted from the external apparatus via the first communication line for transmitting, to the external apparatus, information indicating the current operating status of the data forwarding means of the first microcomputer, i.e., indicating whether (during data forwarding processing) data are being transferred between the first and second microcomputers, or data comparison processing is in progress.

The external apparatus (such as a ROM rewrite apparatus) can thereby be kept continuously aware of whether or not the first microcomputer is currently operating in a "busy" status, and the external apparatus can thereby, when necessary, immediately send a command to the first microcomputer as soon as that microcomputer attains a "not busy" status. In that way it can be ensured that the external apparatus can transmit commands to the first microcomputer without unnecessary delay.

DESCRIPTION OF PREFERRED EMBODIMENTS

Figure 1:
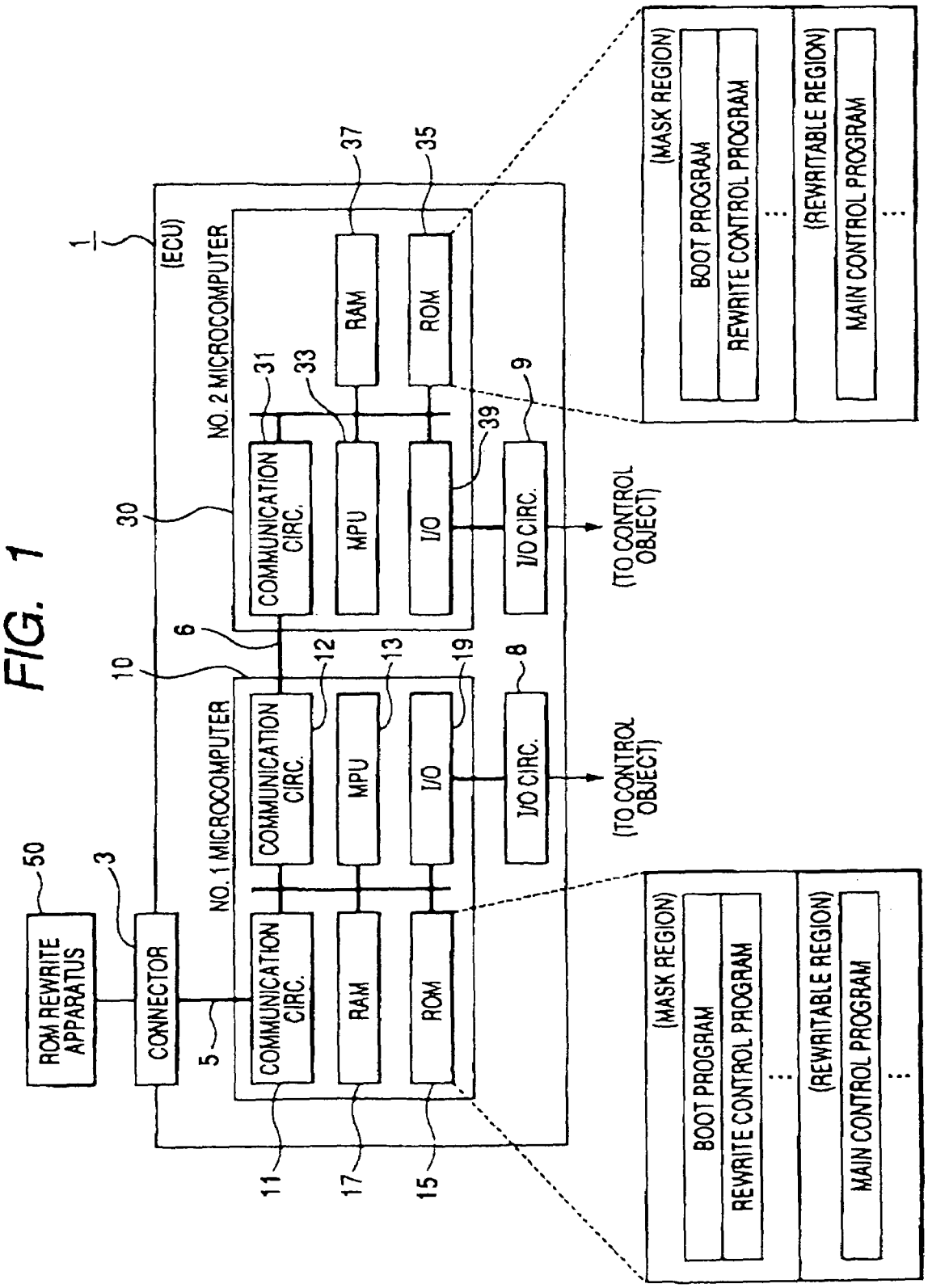
FIG. 1 is a system block diagram showing the general configuration of an embodiment of an ECU having No. 1 and No. 2 microcomputers and a ROM rewrite apparatus that is connected to the embodiment.

FIG. 1 is a general system block diagram for describing an embodiment of an electronic control apparatus, which is an ECU 1 for use in controlling equipment of a motor vehicle, such as the vehicle engine, brakes, suspension, etc. However it should be noted that the present invention is not limited in scope to an electronic control apparatus that is a vehicle ECU, or to any particular form of control that is performed by the electronic control apparatus.

The ECU 1 shown in FIG. 1 includes a No. 1 microcomputer 10 and a No. 2 microcomputer 30, a connector 3 which can be coupled to a connector (not shown in the drawings) of a ROM rewrite apparatus 50 via a data communication link that is external to the ECU 1, a first communication line 5 which connects the connector 3 to the No. 1 microcomputer 10, a second communication line 6 which connects the No. 1 microcomputer 10 and the No. 2 microcomputer 30, an I/O (input/output) circuit 8 through which the No. 1 microcomputer 10 communicates with equipment that it controls, and an I/O circuit 9 through which the No. 2 microcomputer 30 communicates with equipment that it controls.

The first communication line 5 (although internal to the ECU 1) will be referred to in the following as the "external communication line", while the second communication line 6 will be referred to as the "internal communication line".

The No. 1 microcomputer 10 includes a communication circuit 11 that is connected to the external communication line 5, a communication circuit 12 that is connected to the internal communication line 6 for performing serial data communication via the internal communication line 6, a MPU (MultiProcessor Unit) MPU 13 that operates in accordance with a stored program, a ROM (read-only memory) 15 which is a rewritable type of non-volatile memory and stores data including a program whereby the MPU 13 performs calculation processing, a RAM (random access memory) 17 which is a volatile type of memory and which temporarily stores calculation results, etc., that are derived by the MPU 13, and an I/O port 19 through which signals are transferred to/from the I/O circuit 8.

The No. 2 microcomputer 30 includes a communication circuit 31 that is connected to the internal communication line 6 for performing serial data communication via the internal communication line 6, a MPU 33 that operates in accordance with a stored program, a ROM (read-only memory) 35 which is a rewritable type of non-volatile memory and stores data including a program whereby the MPU 33 performs calculation processing, a RAM 37 which temporarily stores calculation results, etc., that are derived by the MPU 33, and an I/O port 39 through which signals are transferred to/from the I/O circuit 9.

With this embodiment, each of the ROMs 15 and 35 is a flash ROM, whose data contents can be electrically rewritten. More specifically, as conceptually illustrated in FIG. 1, each of the ROMs 15 and 16 has a mask region whose contents cannot be deleted or altered, and a rewritable region whose contents can be rewritten.

The rewritable region in each of the ROMs 15, 35 stores main control programs, including programs for controlling one or more control objects, that are executed by the corresponding ROM. The mask region in each of the ROMs 15, 35 stores a boot program that is executed by the corresponding one of the MPUs 13, 33 when power begins to be supplied to the ECU 1, and also a rewrite control program that is executed by the corresponding one of the MPUs 13, 33 for updating or adding to the contents of the rewritable region of the corresponding ROM 15 or 35.

With this embodiment, the ROM rewrite apparatus 50 is connected to the connector 3, and hence to the No. 1 microcomputer 10, only when the contents of the ROM 15 or of the ROM 35 are to be updated, i.e., are to be partially rewritten.

Figure 2A:
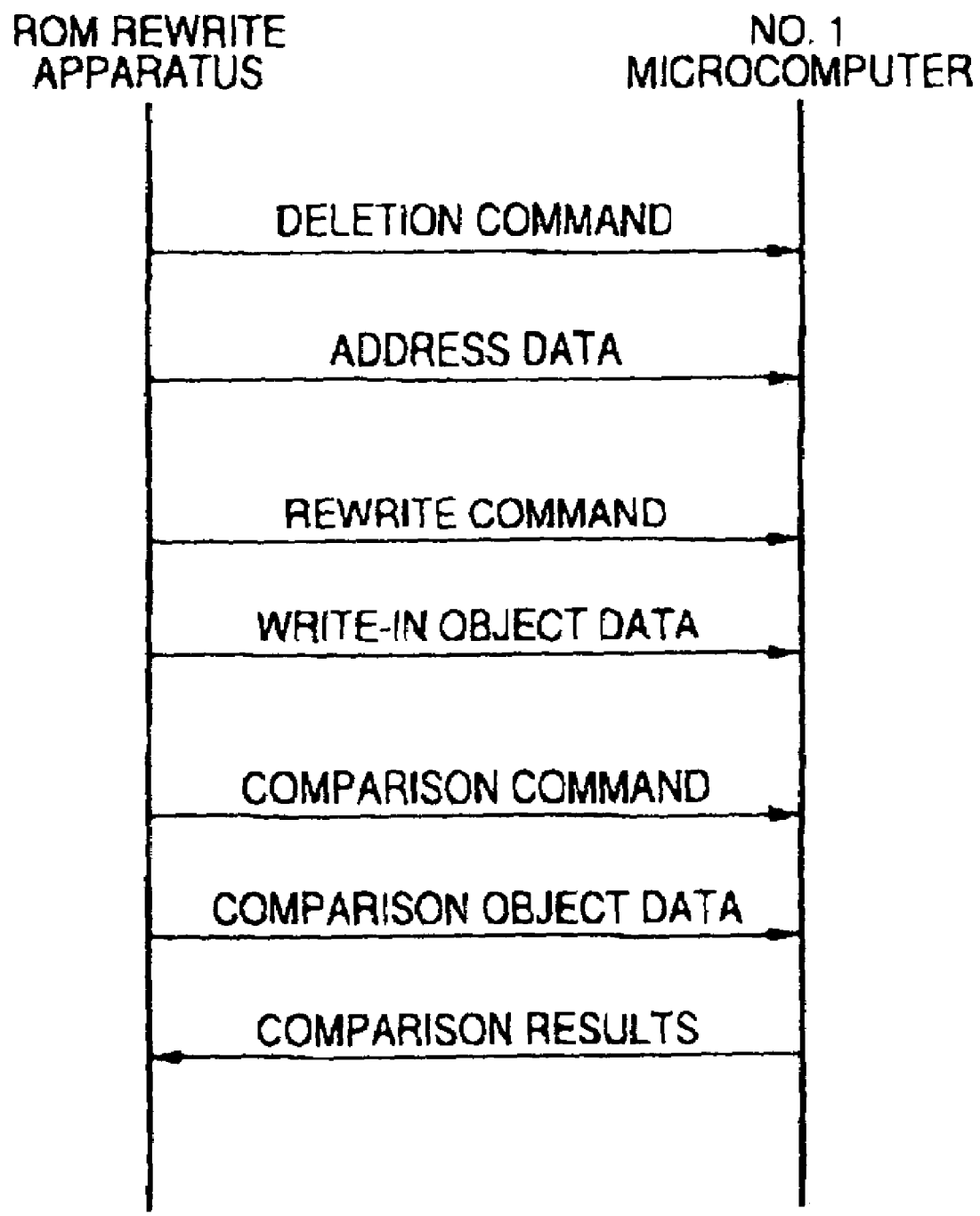
FIG. 2A is a ladder diagram for describing a sequence of operations for updating a ROM of the No. 1 microcomputer of the embodiment.

FIG. 2A is a ladder chart which illustrates the successive interchange of commands and data between the ROM rewrite apparatus 50 and the No. 1 microcomputer 10 when the contents of the ROM 15 are updated. Firstly, the ROM rewrite apparatus 50 transmits destination data (not shown in the drawings) to the No. 1 microcomputer 10, which specify that the contents of the ROM 15 are to be updated, and thereafter transmits a delete command and address data to the No. 1 microcomputer 10. As a result, the MPU 13 of the No. 1 microcomputer 10 begins to execute the data rewrite program, and deletes data that are held in a specific part of the rewritable region of the ROM 15. i.e., at memory addresses specified by the address data from the ROM rewrite apparatus 50. That specific part of the rewritable region is now available for writing in new data.

The No. 1 microcomputer 10 then waits to receive a rewrite command from the ROM rewrite apparatus 50, and when that is received, together with write-in object data (i.e., i.e., data that are to be written into the ROM of the destination microcomputer) from the ROM rewrite apparatus 50, the No. 1 microcomputer 10 writes these data into the aforementioned part of the rewritable region of the ROM 15, from which data have been deleted. The contents of the ROM 15 are thereby updated. Subsequently, the ROM rewrite apparatus 50 transmits a comparison command and comparison object data, which are identical to the precedingly transmitted write-in object data. In response, the No. 1 microcomputer 10 compares the received comparison object data with the data that have been newly written into the aforementioned part of the rewritable region of the ROM 15. The No. 1 microcomputer 10 then transmits the results of the comparison operation to the RON rewrite apparatus 50. With this embodiment, the ROM rewrite apparatus 50 includes a comparison result notification section (not shown in the drawings) for notifying a user (e.g., vehicle driver) of the comparison results received from the No. 1 microcomputer 10, if appropriate.

If it is found from the comparison operation that the comparison object data do not coincide with the data that have been newly written into the aforementioned part of the rewritable region of the ROM 15, then the above procedure of FIG. 2A is repeated.

Figure 2B:
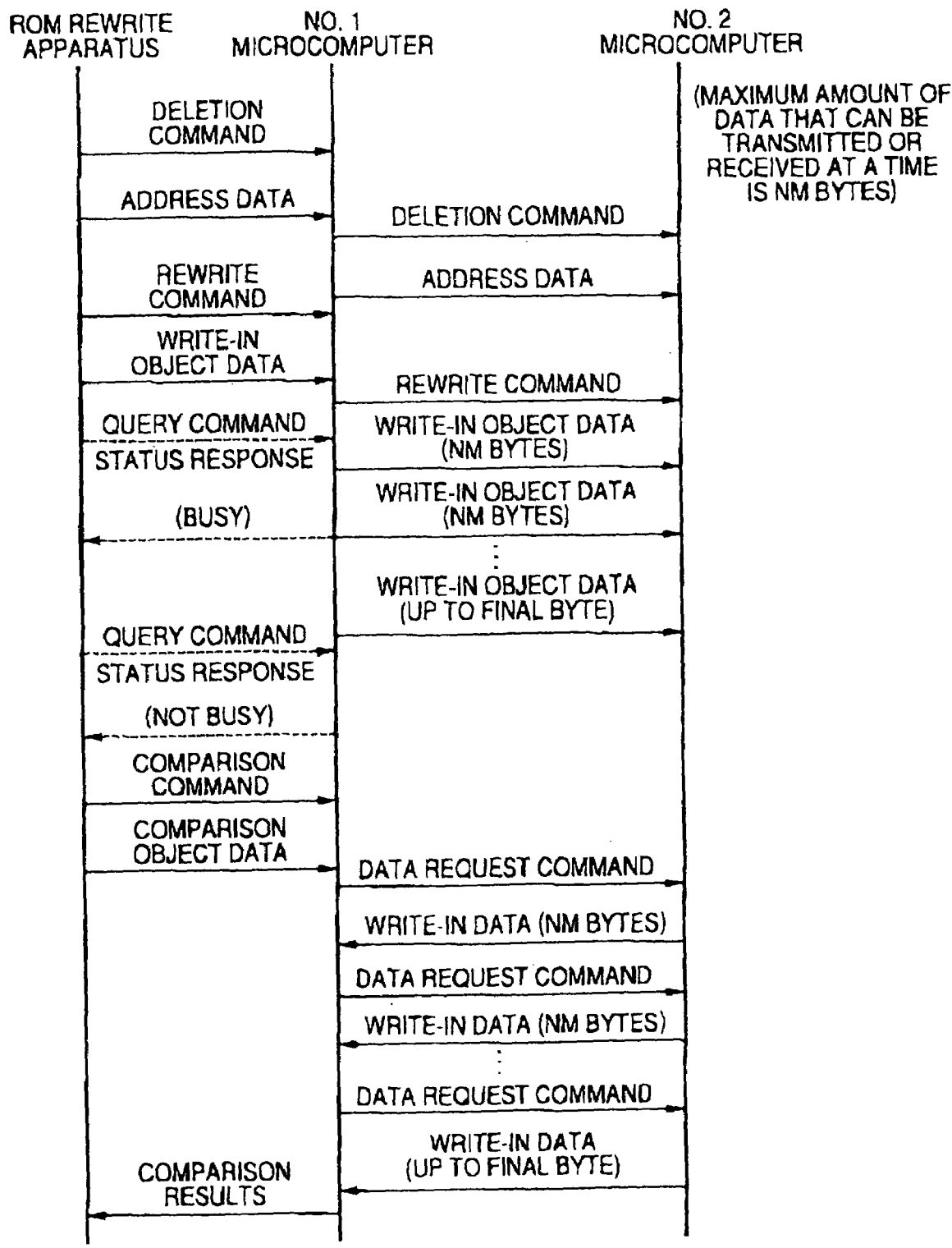
FIG. 2B is a ladder diagram for similarly describing operations for updating a ROM of the No. 2 microcomputer of the embodiment.

FIG. 2B is a ladder chart which illustrates the successive interchange of commands and data between the ROM rewrite apparatus 50, the No. 1 microcomputer 10 and the No. 2 microcomputer 30, when the contents of the ROM 35 of the No. 2 microcomputer 30 are updated. Firstly, the ROM rewrite apparatus 50 transmits destination data (not shown in the drawings) to the No. 1 microcomputer 10, which specify that the contents of the ROM 35 are to be updated, then transmits a delete command and address data to the No. 1 microcomputer 10. In that case, the No. 1 microcomputer 10 recognizes that the ROM 35 of the No. 2 microcomputer 30 is the destination for updating data, and so forwards the received delete command and address data to the No. 2 microcomputer 30. The No. 2 microcomputer 30 then deletes a specific part of the rewritable region of the ROM 35, corresponding to the received address data, in the same way as described for the No. 1 microcomputer 10 above.

In order to enable the ECU 1 to be manufactured at low cost, an inexpensive type of microcomputer is utilized as the No. 2 microcomputer 30, having a relatively low level of data receiving processing performance (i.e., significantly lower than that of the No. 1 microcomputer 10). That is to say, designating the maximum amount of data that can be transmitted from the ROM rewrite apparatus 50 and received by the No. 1 microcomputer 10 at one time as N (bytes), and the maximum amount of data that can be transmitted between the No. 1 microcomputer 10 and No. 2 microcomputer 30 (via the internal communication line 6) at one time as NM (bytes), then NM is smaller than M. Hence, designating DS (bytes) as an amount of write-in object data that are transmitted from the ROM rewrite apparatus 50, if DS is greater than NM, then it will be impossible for the No. 1 microcomputer 10 to simply directly transfer these write-in object data (received via the external communication line 5) to the No. 2 microcomputer 30 (via the internal communication line 6), since data overflow will occur. Hence, correct updating of the contents of the ROM 35 would be impossible.

Hence with this embodiment, instead of simply directly transferring the write-in object data received from the ROM rewrite apparatus 50 to the No. 2 microcomputer 30, the No. 1 microcomputer 10 divides the received write-in object data into successive data blocks each having a size that is no greater than NM bytes, and sequentially transmits these to the No. 2 microcomputer 30.

In order to perform this, the No. 1 microcomputer 10 temporarily stores the write-in object data received from the ROM rewrite apparatus 50 in the RAM 17, before transmitting the data to the No. 2 microcomputer 30.

Figure 3:
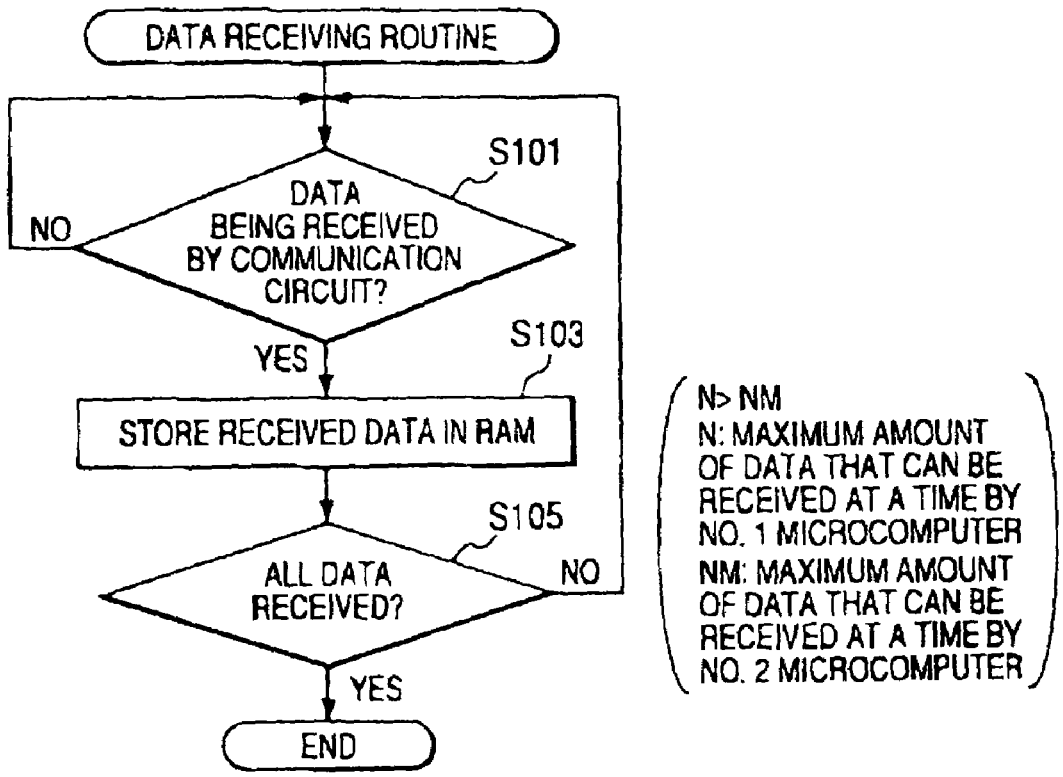
FIG. 3 is a flow diagram of a data receiving routine that is executed by each of the No. 1 and No. 2 microcomputers of the embodiment.

The operation of the No. 1 microcomputer 10 and No. 2 microcomputer 30 will be described more specifically in the following, based on flow diagrams. FIG. 3 is a flow diagram of a data receiving routine that is executed by the No. 1 microcomputer 10 for receiving data via the external communication line 5 or the internal communication line 6, and is executed by the No. 2 microcomputer 30 for receiving data via the internal communication line 6. The routine is executed each time a receiving processing operation occurs, i.e., is continued until all of a set of received data have been processed. The operation will be described for the case of the No. 1 microcomputer 10, however the operation of the No. 2 microcomputer 30 (communicating via the communication circuit 31) is identical. Firstly, a decision is made (step S101) as to whether data are being received by a communication circuit (11 or 12) More specifically, a decision is made as to whether received data are being held in an internal buffer (not shown in the drawings) of the communication circuit 11 or of the communication circuit 12. If so (YES in S101) then the received data are transferred into the RAM 17, to be temporarily stored (step S103). These operations are successively repeated until all of the data have been received (YES in S105), and processing by this routine is then ended.

The data receiving routine of FIG. 3 has been described above for the case of the No. 1 microcomputer 10. Since the amount of data that can be received at one time by the No. 1 microcomputer 10 is N bytes, when a total of N bytes have been received (YES in S105), the receiving operation is terminated. When the data receiving routine of FIG. 3 is executed by the No. 2 microcomputer 30, since the No. 2 microcomputer 30 can receive only NM bytes at a time, the routine is terminated when a total of NM bytes have been received.

Figure 4:
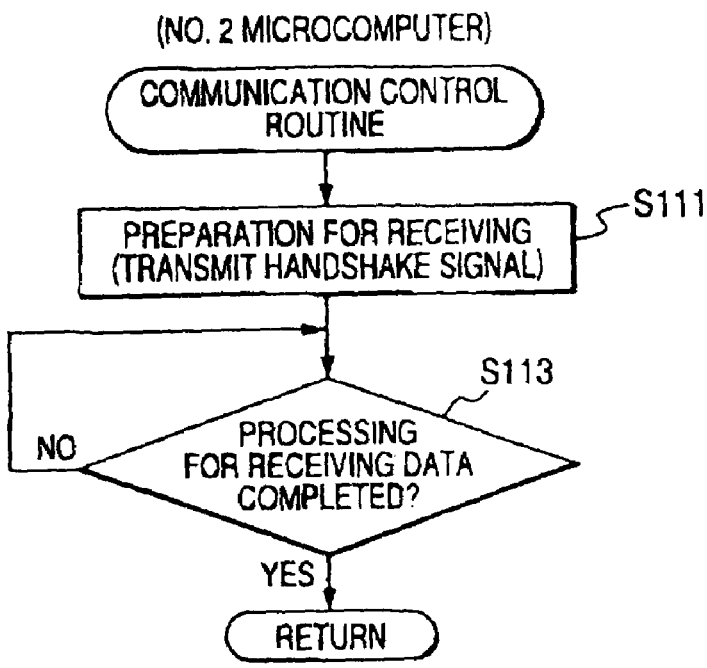
FIG. 4 is a flow diagram of a communication control routine that is repetitively executed by the No. 2 microcomputer of the embodiment.

As preparation for receiving data from the No. 1 microcomputer 10, the No. 2 microcomputer 30 inputs a handshake signal to the No. 1 microcomputer 10 each time that the No. 2 microcomputer 30 attains a condition in which it can accept data sent from the No. 1 microcomputer 10. FIG. 4 is a flow diagram of a communication control routine that is repetitively executed by the No. 2 microcomputer 30.

Firstly, when execution of this routine is started, the No. 2 microcomputer 30 transmits a handshake signal to the No. 1 microcomputer 10 (step S111), and thereafter waits until the completion of performing receiving processing (i.e. to accept a total of NM bytes from the No. 1 microcomputer 10) (step S113). Specifically, when it is judged in step S113 that all of these bytes have not yet been received (NO decision, then operation returns to step S113, while otherwise, this execution of the communication control routine is ended.

Figure 5:
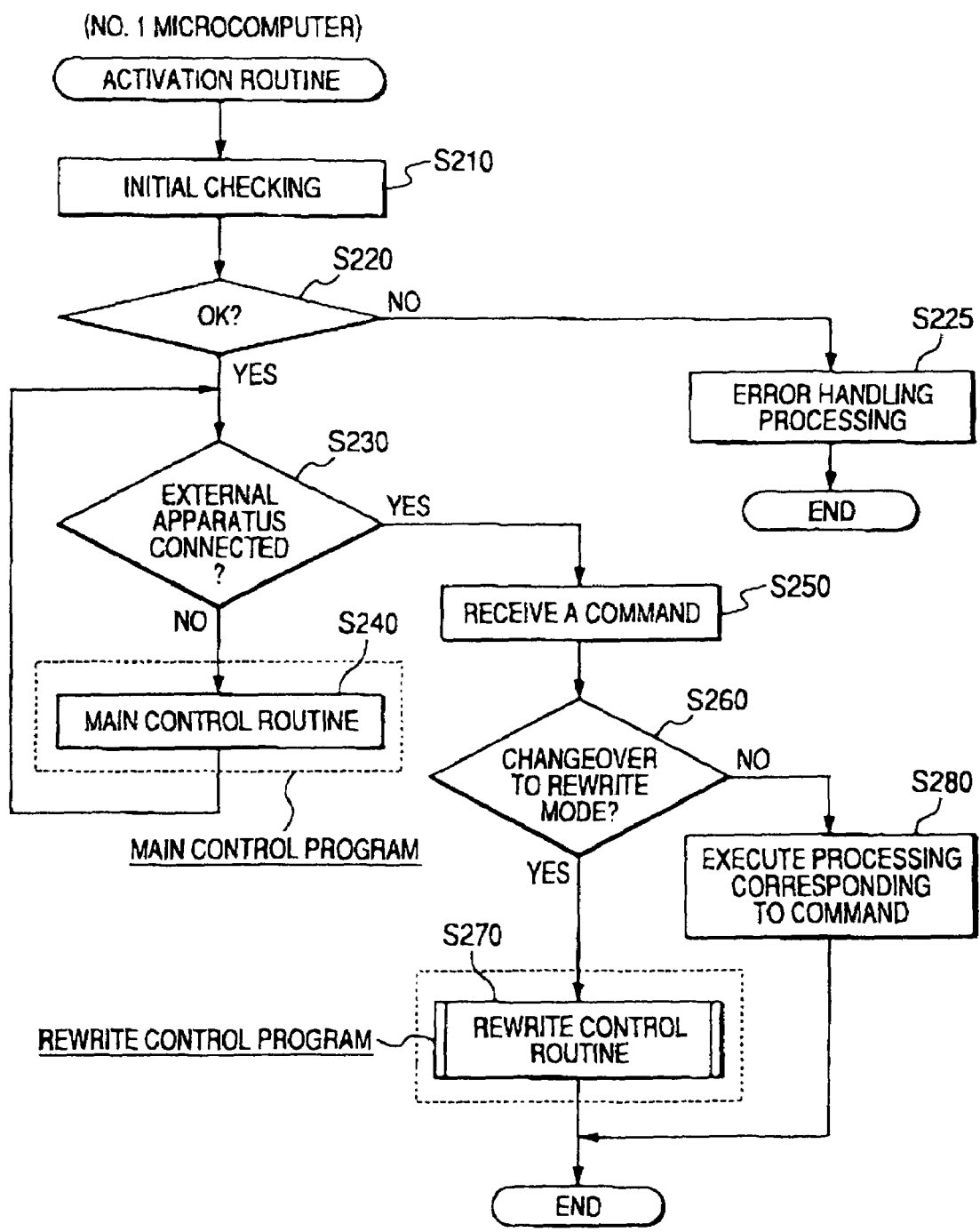
FIG. 5 is a flow diagram of an activation routine that is executed by the No. 1 microcomputer of the embodiment.

An activation routine, executed as part of the boot program when power to the MPU 13 is switched on, is shown in the flow diagram of FIG. 5.

Firstly, the No. 1 microcomputer 10 performs an initial check to determine whether or not the main control program that is stored in the ROM 15 is an appropriate program (step S210). If the check result is negative (NO in S220), the operation proceeds to step S225, in which error handling processing is executed, and execution of the boot program is terminated.

The error handling processing may for example include communicating with an external apparatus or with external failure diagnosis equipment that is connected to the connector 3. Appropriate countermeasures such as failure diagnosis, or updating the program held in the ROM 15, can thereby be performed.

If the check result is positive (YES decision in S220), then a decision is made as to whether an external apparatus such as the ROM rewrite apparatus 50 is connected to the connector 3. If such an apparatus is not connected (NO in step S230)

then a main control program held in the ROM 15 is read out and a main control routine, applied to a control object, is executed (step S240). When execution of this main control routine is completed, operation returns to step S230, to again judge whether an external apparatus is connected to the connector 3. If such an apparatus is found to be connected, then operation proceeds to step S250, in which communication is performed with the external apparatus and a command is received from that external apparatus.

Figure 6:
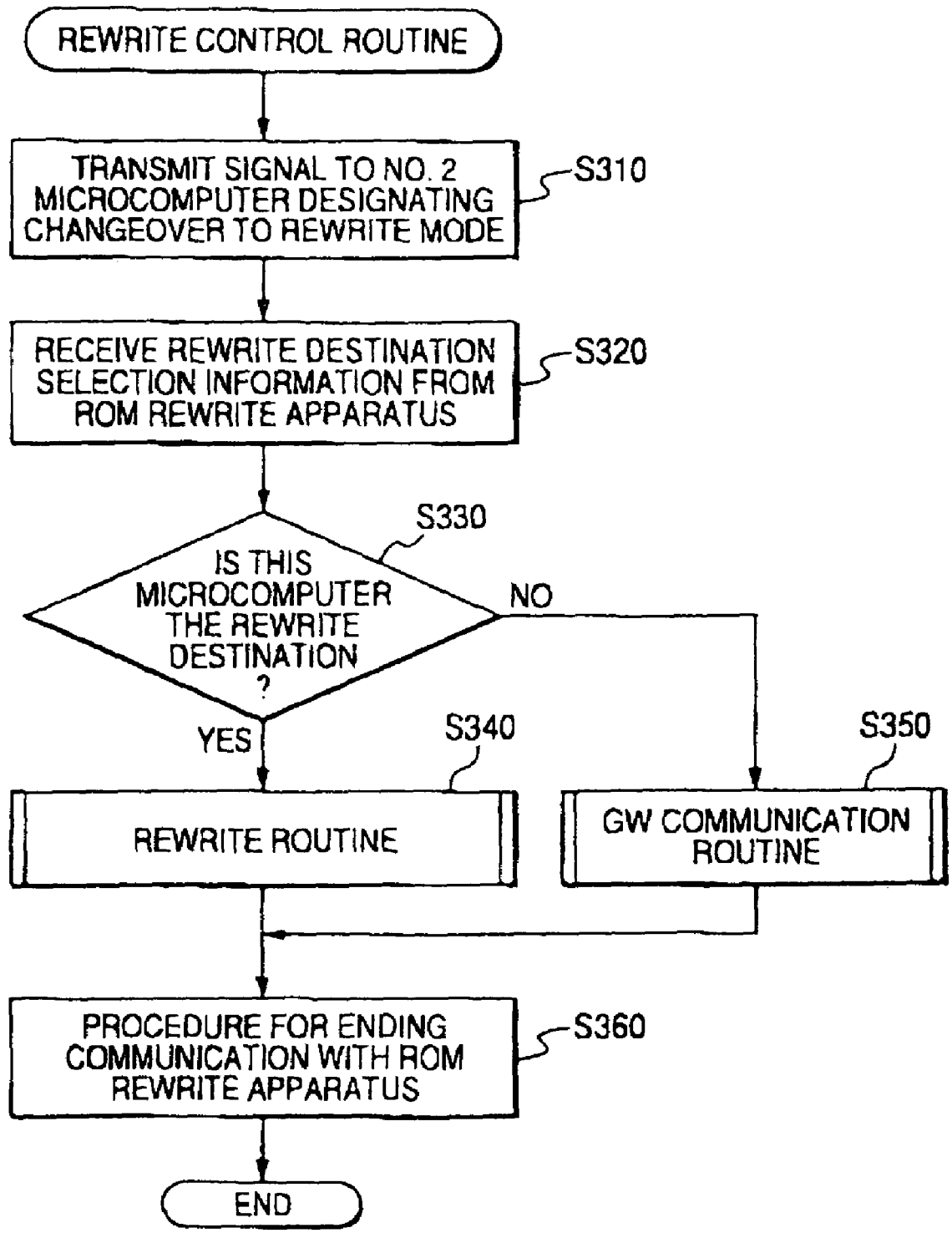
FIG. 6 is a flow diagram of a rewrite control routine that is executed by the No. 1 microcomputer of the embodiment.

If the command designates a changeover to the rewriting mode (YES decision in step S260) then the rewrite control program held in the ROM 15 is read out, and the rewrite control routine shown in FIG. 6 is then executed in accordance with that program (step S270). Execution of the activation routine is then ended.

On the other hand, if the received command is a command other than one which designates changeover to the rewrite mode (NO in step S260), then processing is executed in accordance with that received command (S280), and execution of the activation routine is then ended.

FIG. 6 is a flow diagram of the rewrite control routine that is executed by MPU 13 of the No. 1 microcomputer 10. When this processing is started, the No. 1 microcomputer 10 inputs to the No. 2 microcomputer 30 a signal designating changeover to the rewrite mode (step S310) and the No. 2 microcomputer 30 then begins operation in the rewrite mode. The No. 1 microcomputer 10 then receives the rewrite destination selection information from the ROM rewrite apparatus 50, (step S320).

The rewrite destination selection information includes information specifying the microcomputer whose ROM is to be updated. When the No. 1 microcomputer 10 receives the rewrite destination selection information, it first judges whether it itself is specified as the microcomputer whose ROM is to be updated. If so (YES decision in step S330), then the No. 1 microcomputer 10 executes local rewrite processing (i.e., to update the data in the ROM 15) (S340) When this updating is completed, a procedure is executed for terminating communication with the ROM rewrite apparatus 50 (step S360), and this execution of the rewrite control routine is ended.

However if the rewrite destination selection information received by the No. 1 microcomputer 10 specifies the No. 2 microcomputer 30 (NO in S330) then the No. 1 microcomputer 10 executes GW (gateway) communication processing for transferring commands and data received from the ROM rewrite apparatus 50 to the No. 2 microcomputer 30 (step S350). When the updating of data in the No. 2 microcomputer 30 is completed, the No. 1 microcomputer 10 executes a procedure for ending the communication with the ROM rewrite apparatus 50, and this execution of the rewrite control routine is then ended.

Figure 7:
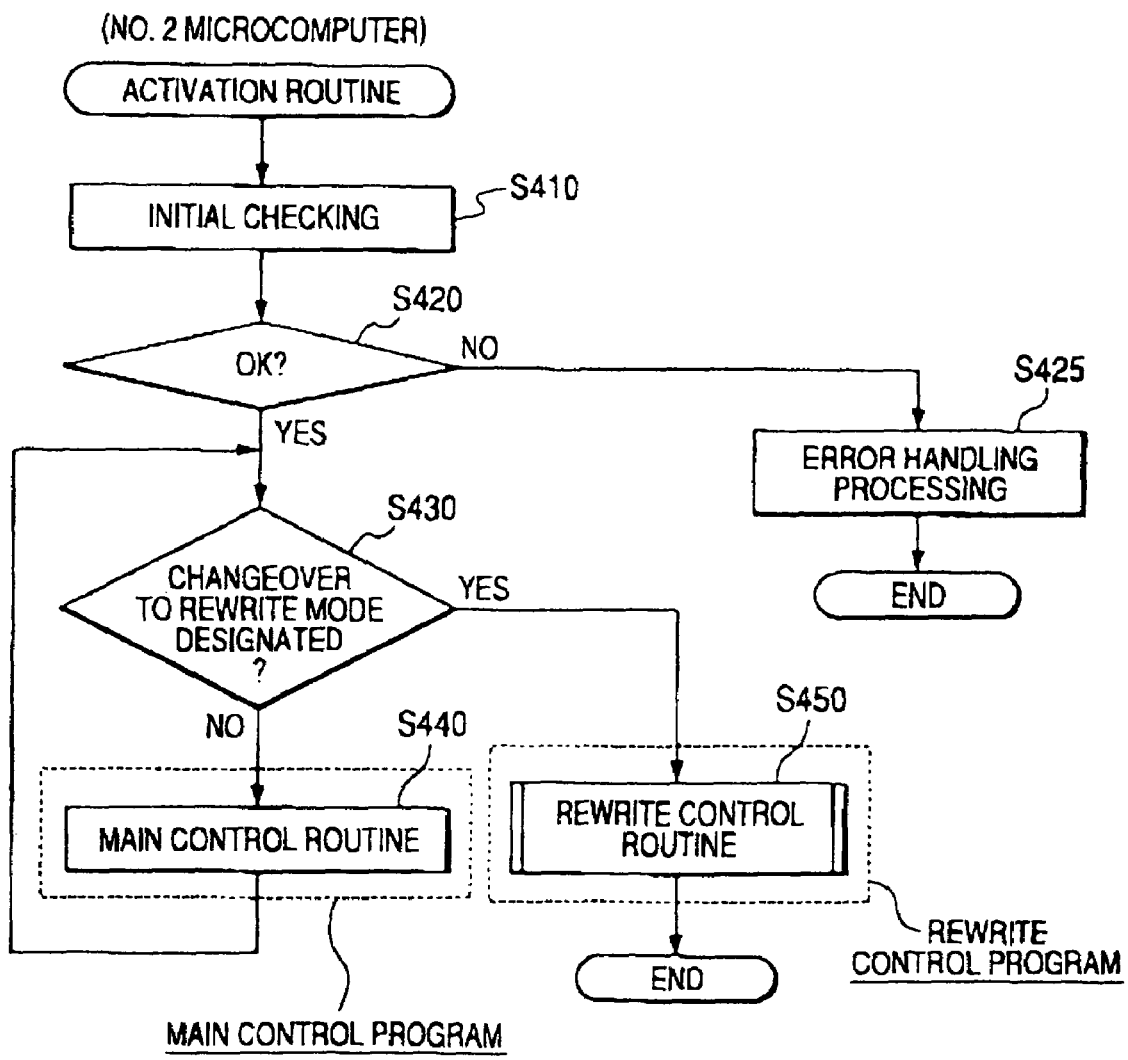
FIG. 7 is a flow diagram of an activation routine that is executed by the No. 2 microcomputer of the embodiment.

The activation routine that is executed by the MPU 33 of the No. 2 microcomputer 30 in accordance with a boot program, when power is switched on, will be described referring to the flow diagram of FIG. 7.

When the activation routine is started, an initial check is performed to judge whether or not the main control program that is stored in the ROM 35 is appropriate (step S410). If the check result is negative (NO in step S420) then error handling processing is executed (step S425) and the activation routine is then ended. If the check result is satisfactory (YES decision in step 5420) then a decision is made as to whether a signal designating changeover to the rewrite mode is received from the No. 1 microcomputer 10 (step S430). If that signal is not being received (NO in S430) then the main control program that is held in the ROM 35 is read out and a main control routine is executed in accordance with the main control program, for controlling a control object (step S440). When that is completed, the judgement step S430 is again executed, to determine whether or not the signal designating changeover to the rewrite mode is being received from the No. 1 microcomputer 10.

Figure 15:
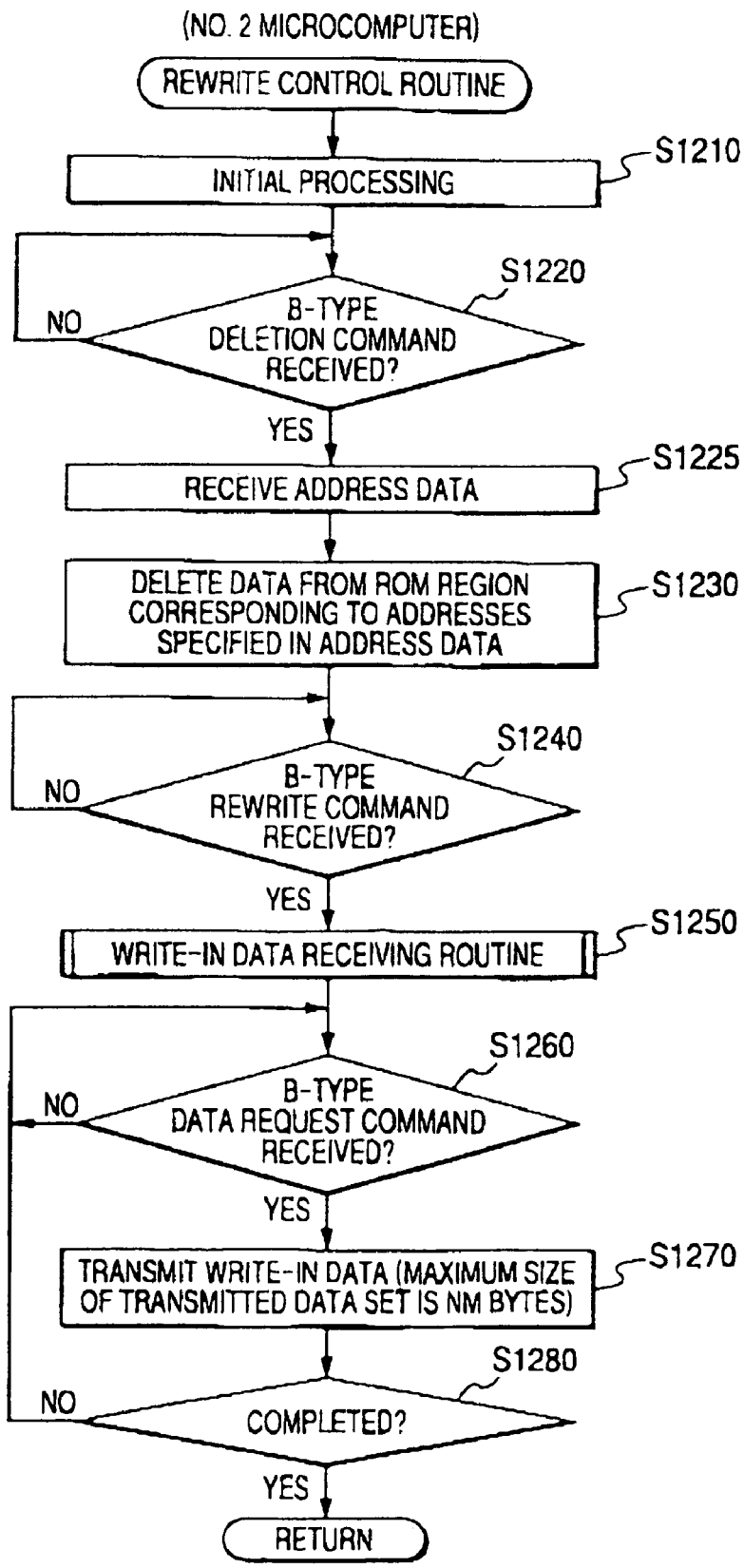
FIG. 15 is a flow diagram of a rewrite control routine that is executed by the No. 2 microcomputer of the embodiment; and, FIG. 16 is a flow diagram of a receiving and write-in routine that is executed by the No. 2 microcomputer of the embodiment.

If it is found that this signal is being received (YES in S430) then the rewrite control program held in the ROM 35 is read out, and the processing illustrated in FIG. 15 is executed (step S450). The activation routine is then ended.

Figure 8:
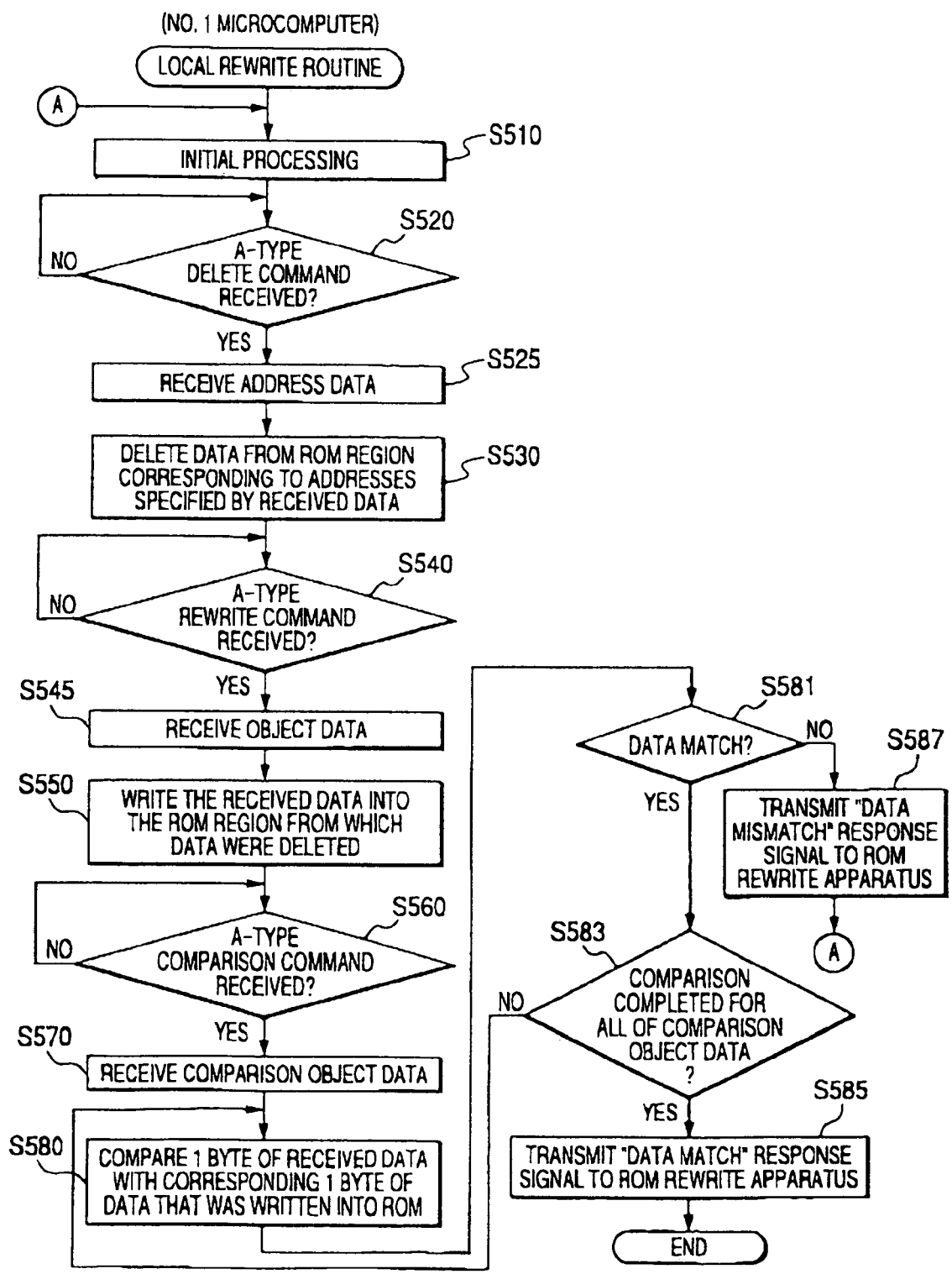
FIG. 8 is a flow diagram of a local rewrite routine that is executed by the No. 1 microcomputer of the embodiment.

The local rewrite routine that is executed by MPU 13 of the No. 1 microcomputer 10 in step S340 will be described in the following, referring to the flow diagram of FIG. 8.

Firstly, the No. 1 microcomputer 10 performs initial processing that is required for executing communication (step S510), then waits to receive a deletion command (transferred from the ROM rewrite apparatus 50 via the communication circuit 11) which designates that a region in ROM 15 is to be erased (step S520). When the deletion command is received (YES decision in S520), address data are then received from the ROM rewrite apparatus 50 via the communication circuit 11 (step S525). These address data express memory addresses correspond to the region in ROM 15 in which data are to be deleted.

When these address data are received, the No. 1 microcomputer 10 analyzes the data and deletes the data held in the region of the ROM 15 corresponding to the addresses that are specified by the received address data (step S530). On completion of deleting the data, the No. 1 microcomputer 10 waits to receive a rewrite command from the ROM rewrite apparatus 50 via the communication circuit 11, for writing specific data (i.e., write-in object data) into the aforementioned region of the ROM 15 from which data have been deleted.

When the rewrite command is received (YES in step S540) then the write-in object data are subsequently received (step S545), and are then written into the aforementioned region of the ROM 15 from which data have been deleted (step S550).

On completion of this data write-in, the No. 1 microcomputer 10 waits to receive a comparison command from the ROM rewrite apparatus 50, designating that the data which have been written into the ROM 15 in S550 are to be read out and compared with the corresponding data actually received from the ROM rewrite apparatus 50. When the comparison command is received from the ROM rewrite apparatus 50 via the communication circuit 11 (YES in S560), the No. 1 microcomputer 10 then (step S570) receives comparison object data transmitted from the ROM rewrite apparatus 50 (i.e., with the comparison object data being identical to the write-in object data that were previously received in S545).

The No. 1 microcomputer 10 then (step S50) compares one byte of the received comparison object data with the corresponding byte from the aforementioned data that were written into the ROM 15 (i.e., the corresponding byte of the data that were stored as the write-in object data is read out, and compared). If the bytes are found to be identical (YES decision in S581) then a decision is made (step S583) as to whether all of the received comparison object data have been compared with the data that were stored as the write-in object data.

If it is found that all bytes of the comparison object data have not yet been compared (No in step S583) then operation returns to step S580, and steps S580, 581 repeated, to compare another byte of the comparison object data with a byte from the stored write-in object data.

If it is found in step S581 that the compared bytes do not match, then operation proceeds to step 587.

When it is found in S583 that all bytes of the comparison object data have been compared (YES in step S583) the No. 1 microcomputer 10 transmits to the ROM rewrite apparatus 50, via the communication circuit 11, a response signal indicating that the comparison object data and the stored write-in object data match one another (step S585). Execution of the local rewrite routine then ends.

On the other hand, if it is found in step S581 that the compared bytes do not match (NO in S581), then operation proceeds to step S587, in which the No. 1 microcomputer 10 transmits to the ROM rewrite apparatus 50, via the communication circuit 11, a response signal indicating that the comparison object data and the stored write-in object data do not match one another. Operation then returns to step S510, and the local rewrite routine is again executed.

Figure 9:
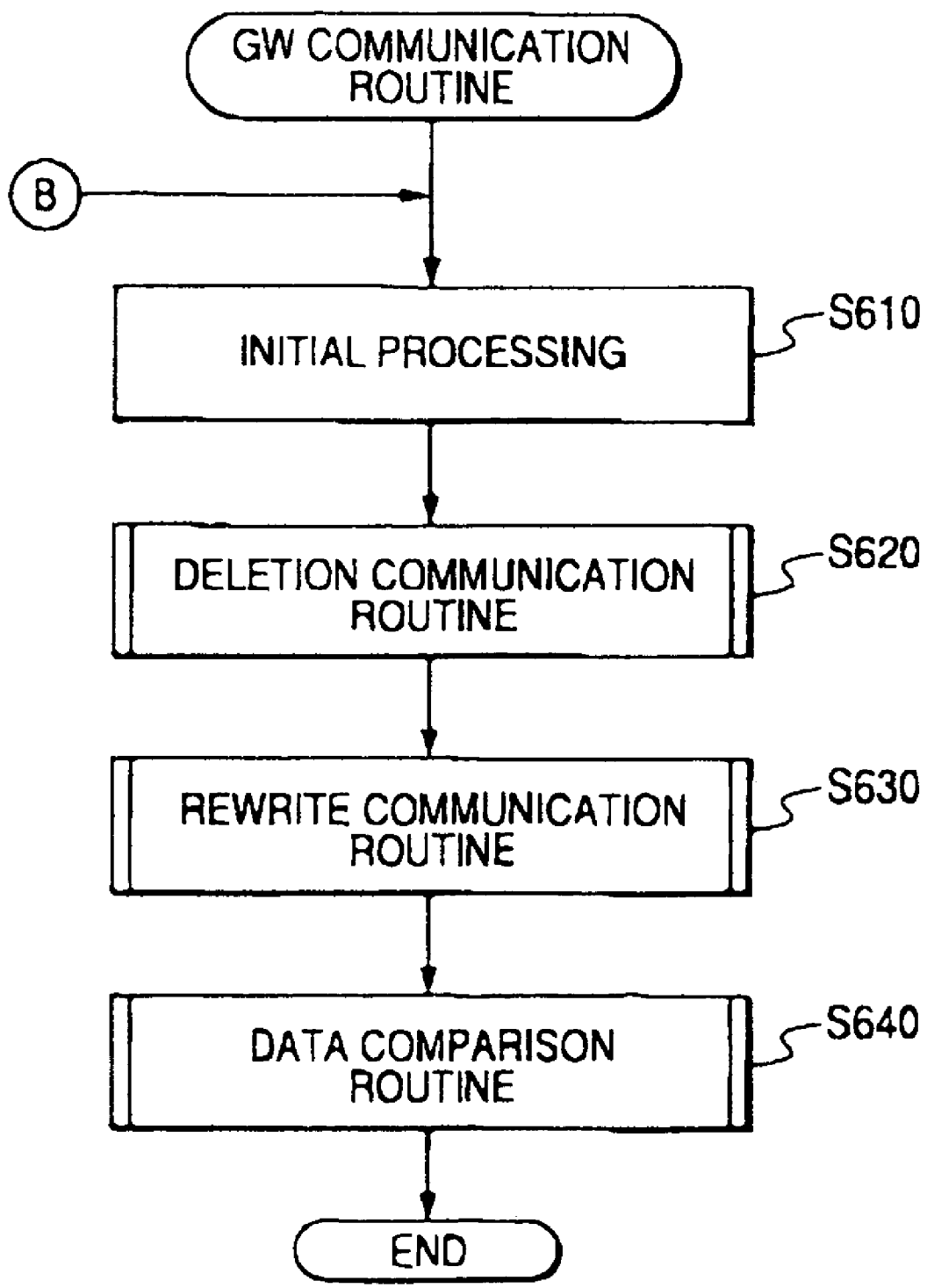
FIG. 9 is a flow diagram of a GW communication routine that is executed by the No. 1 microcomputer of the embodiment.

The GW communication routine (executed in step S350 of the flow diagram of FIG. 6) is shown in the flow diagram of FIG. 9. Firstly the No. 1 microcomputer 10 performs initial processing relating to communication (step S610), then executes the deletion routine shown in FIG. 10 (step S620).

In the following description, commands and data that are in a format whereby they can be utilized (e.g., received and executed, or stored) by the No. 1 microcomputer 10 will be indicated as "A-type" commands or data, while commands and data that are in a format whereby they can be utilized by the No. 2 microcomputer 30 will be indicated as "B-type" commands or data.

Figure 10:
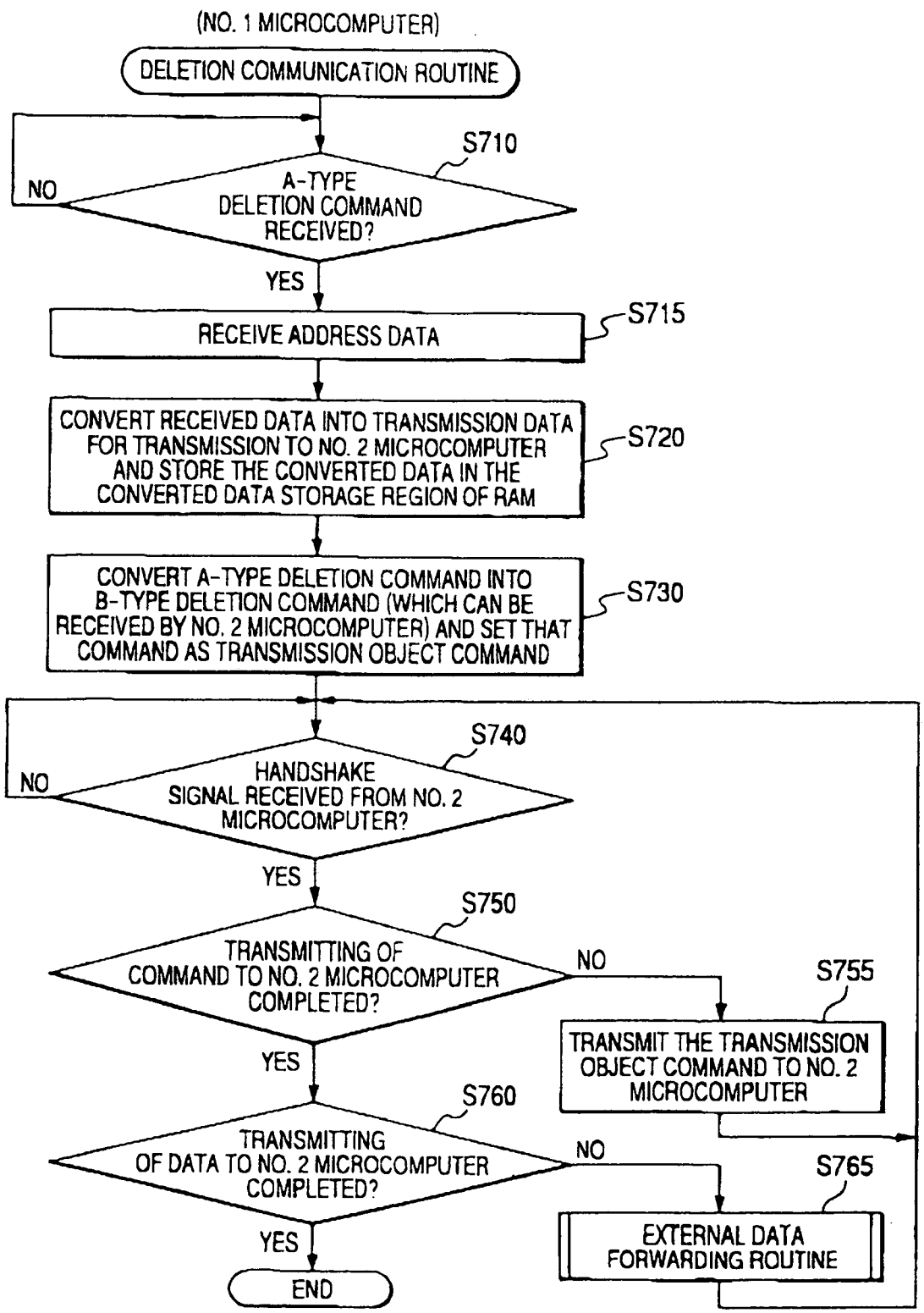
FIG. 10 is a flow diagram of a deletion communication routine that is executed by the No. 1 microcomputer of the embodiment.

In the deletion routine shown in the flow diagram of FIG. 10, the No. 1 microcomputer 10 first waits to receive an A-type deletion command from the RON rewrite apparatus 50, transmitted via the communication circuit 11. When the command is received (YES in step S710) the address data that are sent from the ROM rewrite apparatus 50 via the communication circuit 11 are then received (step S715)

The No. 1 microcomputer 10 then converts the received address data into address data that can be utilized by the No. 2 microcomputer 30, and generates communication data expressing this converted address data (for transmission to the No. 2 microcomputer 30), then stores the generated communication data in a transmission data storage region of the RAM 17 (step S720).

The No. 1 microcomputer 10 then converts the received A-type deletion command to a B-type deletion command (i.e., which can be received and executed by the No. 2 microcomputer 30), and the B-type deletion command is then designated as a transmission object command (step S730).

When the processing of step S730 is completed, the No. 1 microcomputer 10 judges (step S740) whether a handshake signal is received from the No. 2 microcomputer 30 via the communication circuit 12. If not received (NO in step S740) the No. 1 microcomputer 10 waits to receive the handshake signal. When that signal is received (YES in step S740) a decision is made as to whether transmitting of a command to the No. 2 microcomputer 30 has been completed. If all of the command (i.e., that was designated as a transmission object command in step S730) has not yet been transmitted (NO in step S750) then step S755 is executed, in which a remaining part of the transmission object command is transmitted to the No. 2 microcomputer 30 via the communication circuit 12.

Operation then returns to step S740, to wait to receive a handshake signal from the No. 2 microcomputer 30, whereupon step S750 is again executed, to determine whether all of the transmission object command has been transmitted to the No. 2 microcomputer 30.

If it is found in step S750 that all of the transmission object command has been transmitted to the No. 2 microcomputer 30, a decision is made as to whether all of the converted address data (stored in step S720, as described above) have been transmitted to the No. 2 microcomputer 30. If all of these data have not yet been transmitted (NO in step S760) then operation proceeds to step S765, in which the external data transfer routine (shown in the flow diagram of FIG. 11) is executed.

When execution of the external data transfer routine is first started, the NM bytes of transmission data that are held in the leading addresses of the transmission data storage region of the RAM 17 (having been stored therein as described above) are read out by the No. 1 microcomputer 10, and transmitted to the No. 2 microcomputer 30 via the communication circuit 12 (step S810).

Next (step S820) a decision is made as to whether all of the transmission data held in the transmission data storage region of the RAM 17 have been transmitted. If not (NO in step S820), the No. 1 microcomputer 10 waits to receive a handshake signal from the No. 2 microcomputer 30 (step S830). When the handshake signal is received (YES in step S830), operation returns to step S810, in which the next NM bytes of untransmitted communication data that are held in the leading addresses of the transmission data storage region of the RAM 17 are read out and transmitted via the communication circuit 12 to the No. 2 microcomputer 30.

The above processing sequence is successively repeated until all of the transmission data held in the transmission data storage region of the RAM 17 have been transmitted to the No. 2 microcomputer 30 (YES decision in step S820) whereupon execution of this external data transfer routine is ended, i.e., processing returns to step S740 of the deletion communication routine shown in FIG. 10

Thereafter, if it is found that the B-type command and all of the transmission data have been successfully transmitted (YES decision in each of steps S750, S760), this execution of the deletion communication routine is ended.

Figure 12:
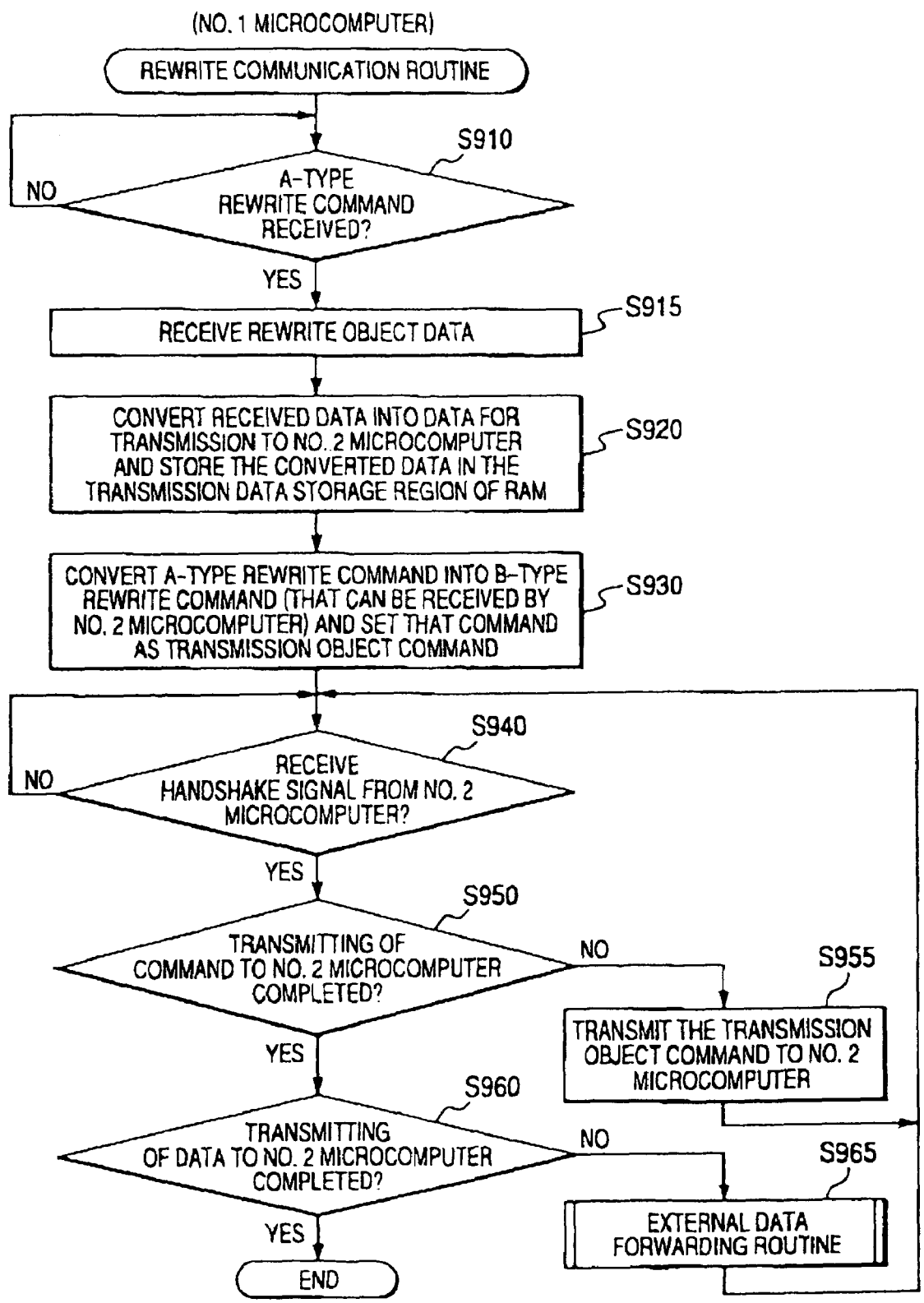
FIG. 12 is a flow diagram of a rewrite communication routine that is executed by the No. 1 microcomputer of the embodiment.

The No. 1 microcomputer 10 then begins to execute step S630 of FIG. 9. i.e. the rewrite communication routine shown in the flow diagram of FIG. 12. Firstly (step S910) the No. 1 microcomputer 10 waits to receive an A-type rewrite command from the ROM rewrite apparatus 50, sent via the communication circuit 11. After such a command has been received (YES in step S910), write-in object data that are transmitted from the ROM rewrite apparatus 50 are received via the communication circuit 11 (step S915).

The No. 1 microcomputer 10 then converts these received write-in object data into a format which can be handled by the No. 2 microcomputer 30, as transmission data to be transmitted to the No. 2 microcomputer 30. These transmission data are then stored in the transmission data storage region of the RAM 17 (step S920).

When the processing of step S920 is completed, the received A-type rewrite command is converted to a B-type rewrite command (i.e., which can be handled by the No. 2 microcomputer 30), and that command is designated as a transmission object command (step S930). Next (step S940), the No. 1 microcomputer 10 waits to receive a handshake signal from the No. 2 microcomputer 30, transmitted via the communication circuit 12. When it is found that a handshake signal is being received (YES decision in step S940), the No. 1 microcomputer 10 judges whether or not the entirety of the aforementioned transmission object command has been transmitted to the No. 2 microcomputer 30 (step S950). If not (NO in step S950), operation proceeds to step S955, in which a remaining (untransmitted) part of the transmission object command is transmitted to the No. 2 microcomputer 30. Processing by the No. 1 microcomputer 10 then returns to step S940, to again wait to receive a handshake signal from the No. 2 microcomputer 30, and then again execute step S950.

Figure 11:
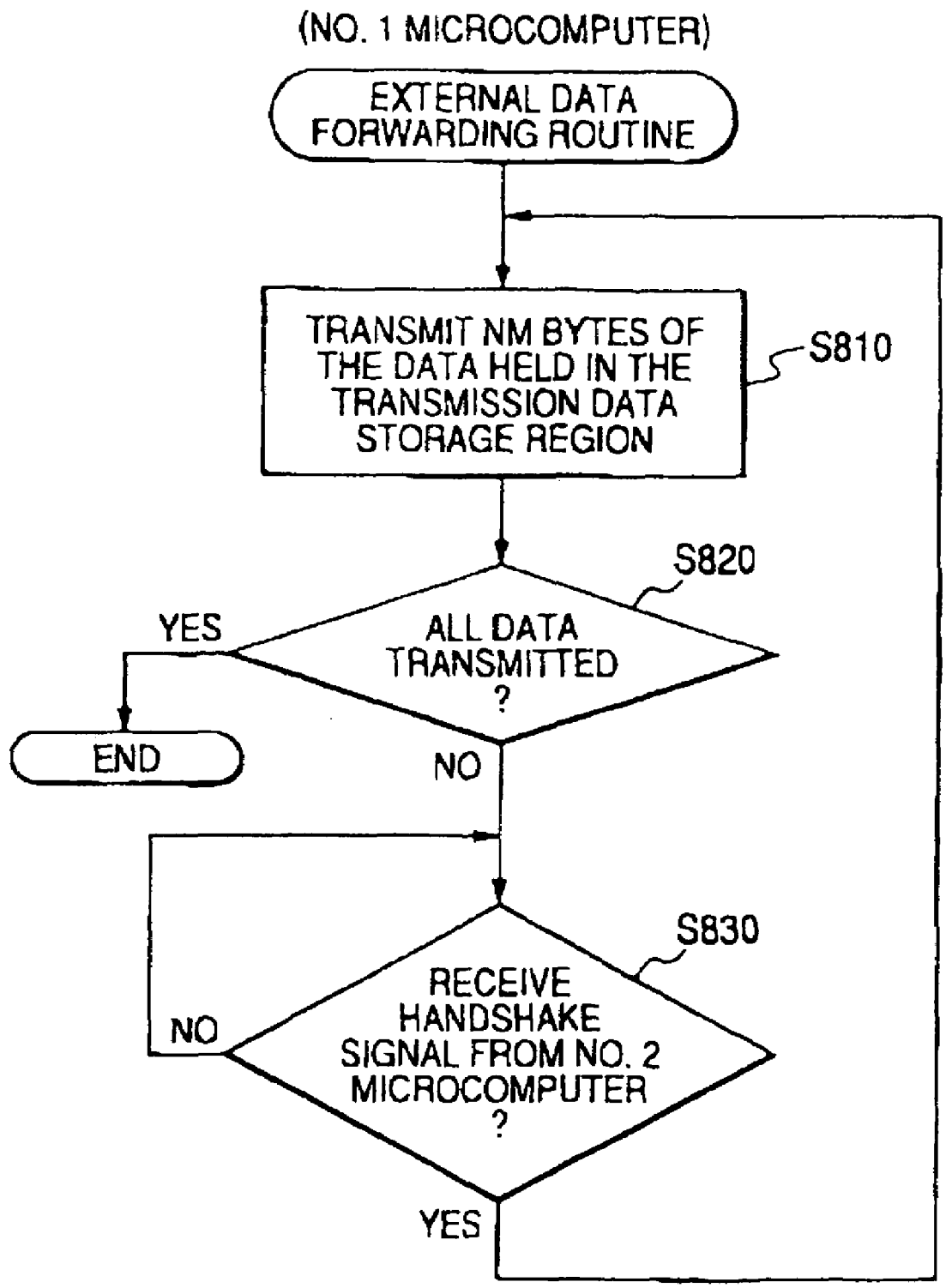
FIG. 11 is a flow diagram of an external data transfer routine that is executed by the No. 1 microcomputer of the embodiment.

When it is found in step S950 (YES decision) that all of the transmission object command has been transmitted to the No. 2 microcomputer 30, a decision is made (step S960) as to whether transmitting of the transmission data (generated in step S920, held in the transmission data storage region of the RAM 17) to the No. 2 microcomputer 30 has been completed. If not (NO in step S960) the external data transfer routine shown in FIG. 11 is executed (S965), thereby sending the transmission data (the aforementioned converted write-in data) to the No. 2 microcomputer 30, in the same manner as described hereinabove referring to steps S760, S765 of the deletion communication routine shown in FIG. 10.

Each block of NM bytes of transmission data that are received by the No. 2 microcomputer 30 (at each execution of step S810 of FIG. 11, by the No. 1 microcomputer 10) are processed by the MPU 33, and the contents conveyed in these NM bytes of transmission data (i.e., a part of the aforementioned converted write-in object data) are written into the ROM 35. Upon each completion of such a data write-in operation, the No. 2 microcomputer 30 transmits a handshake signal to the No. 1 microcomputer 10, which is detected by the No. 1 microcomputer 10 in step S830 of FIG. 11 as described hereinabove. The processing of FIG. 11 is repeated until a final part of the transmission data (i.e. which may be less than NM bytes) have been transmitted to the No. 2 microcomputer 30.

On completion of executing the external data transfer routine in S965 of the rewrite communication routine of FIG. 12, steps S940, S950, S960 are again repeated, and if there is then a YES decision in each of steps S950. S960 (indicating that the B-type command and all of the transmission data have been transmitted) this execution of the rewrite communication routine is ended.

Figure 13:
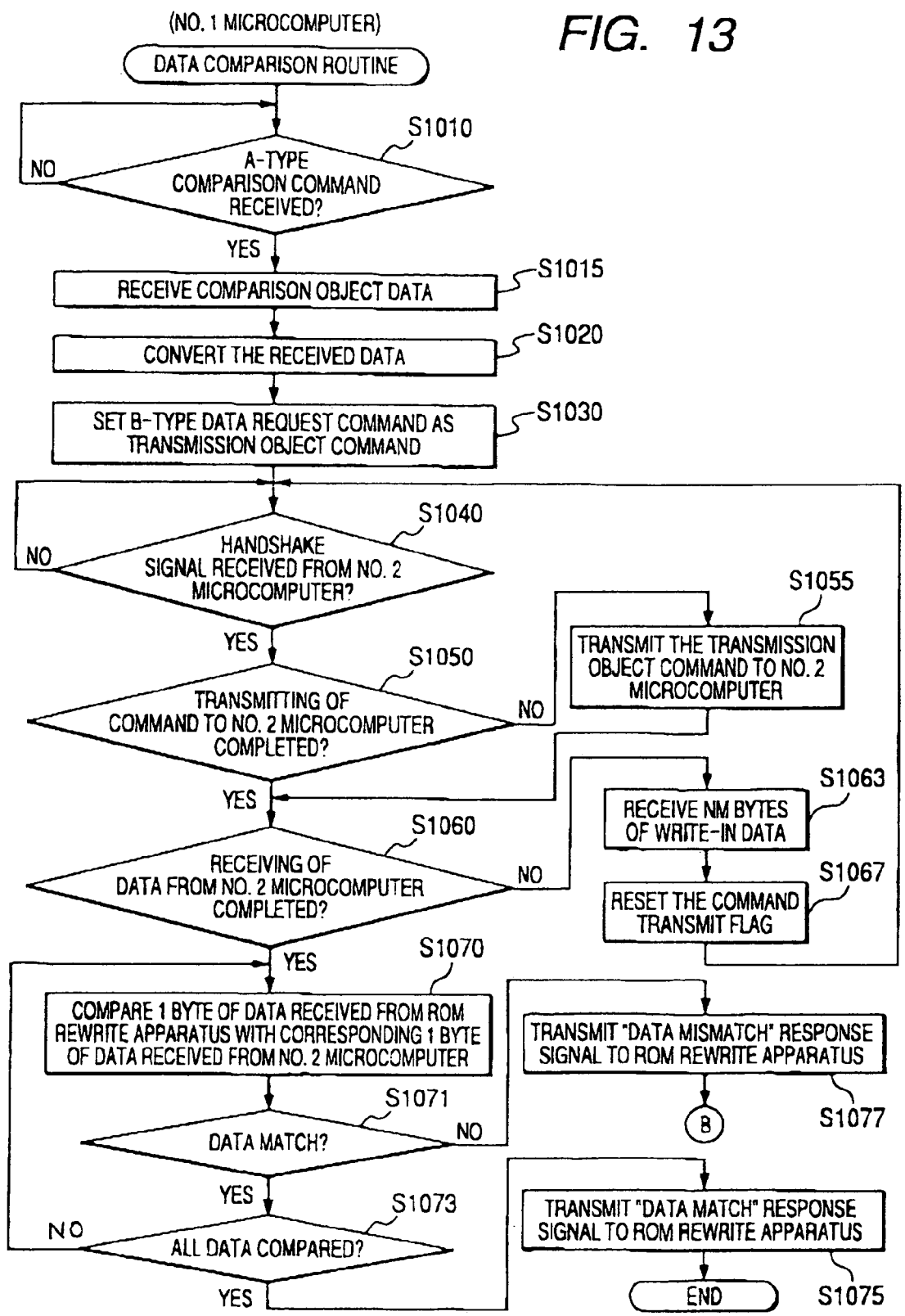
FIG. 13 is a flow diagram of a data comparison routine that is executed by the No. 1 microcomputer of the embodiment.

The No. 1 microcomputer 10 then proceeds to execution of the data comparison routine (5640 in FIG. 9), shown in the flow diagram of FIG. 13. First, the No. 1 microcomputer 10 waits to receive an A-type comparison command sent from the ROM rewrite apparatus 50 via the communication circuit 11. After that command has been received (YES in step S1010), comparison object data are received from the ROM rewrite apparatus 50 via the communication circuit 11 (step S1015).

The No. 1 microcomputer 10 then converts the received comparison object data into a format that can be interpreted by the No. 2 microcomputer 30 (in the same way as described above for the write-in object data), stores these converted comparison object data in the RAM 17 (step S1020). The No. 1 microcomputer 10 then generates a B-type data request command, for instructing the No. 2 microcomputer 30 to perform data write-in to the ROM 35, and sets that command as a transmission object command (step S1030).

Next (step S1020) a decision is made as to whether the handshake signal is received from the No. 2 microcomputer 30 via the communication circuit 12. If a handshake signal is being received (YES decision in step S1040) the No. 1 microcomputer 10 judges (step S1050) whether transmitting of the transmission object command to the No. 2 microcomputer 30 has been completed, and if that command has not yet been transmitted (NO in step S1050), the transmission object command (set in step S1030 described above) is transmitted via the communication circuit 12 to the No. 2 microcomputer 30 (step S1055). Operation then proceeds to step S1060.

In step S1060, the No. 1 microcomputer 10 judges whether receiving of data from the No. 2 microcomputer 30 (for use in comparison processing) has been completed. If not (NO in step S1060), the No. 1 microcomputer 10 receives NM bytes of rewrite data, sent from the No. 2 microcomputer 30 via the communication circuit 12 (step S1063) in response to reception of the data request command by the No. 2 microcomputer 30. S1067 is then executed, in which the command transmit flag is reset. This flag is used as a judgement reference in step S1250, i.e., if the command transmit flag is found to be reset, then it is judged in step S1050 that transmission of the transmission object command has not yet been completed.

Following step S1067, S1040 is returned to, to wait for a handshake signal transmitted from the No. 2 microcomputer 30, which is sent each time that the No. 2 microcomputer 30 completes receiving of a block of NM bytes.

When a handshake signal is then received (YES in step S1040), a NO will again be reached in step S1050, so that the data request command is again transmitted to the No. 2 microcomputer 30 (step S1055). A decision is then made as to whether all of the write-in data have been received from the No. 2 microcomputer 30 (step S1060), and if not, S1063 is again executed, to receive another block of NM bytes of write-in data from the No. 2 microcomputer 30, and S1067 is then again executed.

If it is judged that all of the write-in data have been received from the No. 2 microcomputer 30 (YES in step S1060), operation proceeds to step S1070, in which one byte (i.e., initially, the leading byte) of the aforementioned converted comparison object data held in the RAM 17 (converted and stored in step S1020, as described above) with the corresponding byte (in this case, the leading byte) of the write-in data received from the No. 2 microcomputer 30 (step S1070)

If the two bytes are found to match one another (YES in step S1071), a decision is made as to whether all of the bytes of the comparison object data have been compared. If not (NO in step S1073), the next byte of the comparison object data is compared with the next byte of the received write-in data from the No. 2 microcomputer 30 (step S1070).

If the two compared bytes are not found to match one another (NO in step S1071) then operation proceeds to step S1077, in which a "data mismatch" response signal, indicating a mismatch between the comparison object data and the received write-in data from the No. 2 microcomputer 30, is transmitted to the ROM rewrite apparatus 50 by the No. 1 microcomputer 10. The sequence of steps S1070, S1071, S1073 are repetitively executed (so long as no data mismatch is detected) until it is judged in step S1073 that all of the comparison object data have been compared with the received write-in data from the No. 2 microcomputer 30, and step S1075 is then executed. In step S1075 the No. 1 microcomputer 10 transmits to the ROM rewrite apparatus 50 a "data match" response signal, indicating that the comparison object data and the write-in data that have been stored in the ROM 35 of the No. 2 microcomputer 30 are identical to one another. This execution of the data comparison routine is then ended, so that execution of the GW communication routine of FIG. 9 is also ended If a data mismatch is detected in step S1071 and the No. 1 microcomputer 10 transmits a corresponding "data mismatch" response signal to the ROM rewrite apparatus 50 in step S1077, its operation then returns to the initial routine shown in FIG. 9 (step S610).

Figure 14:
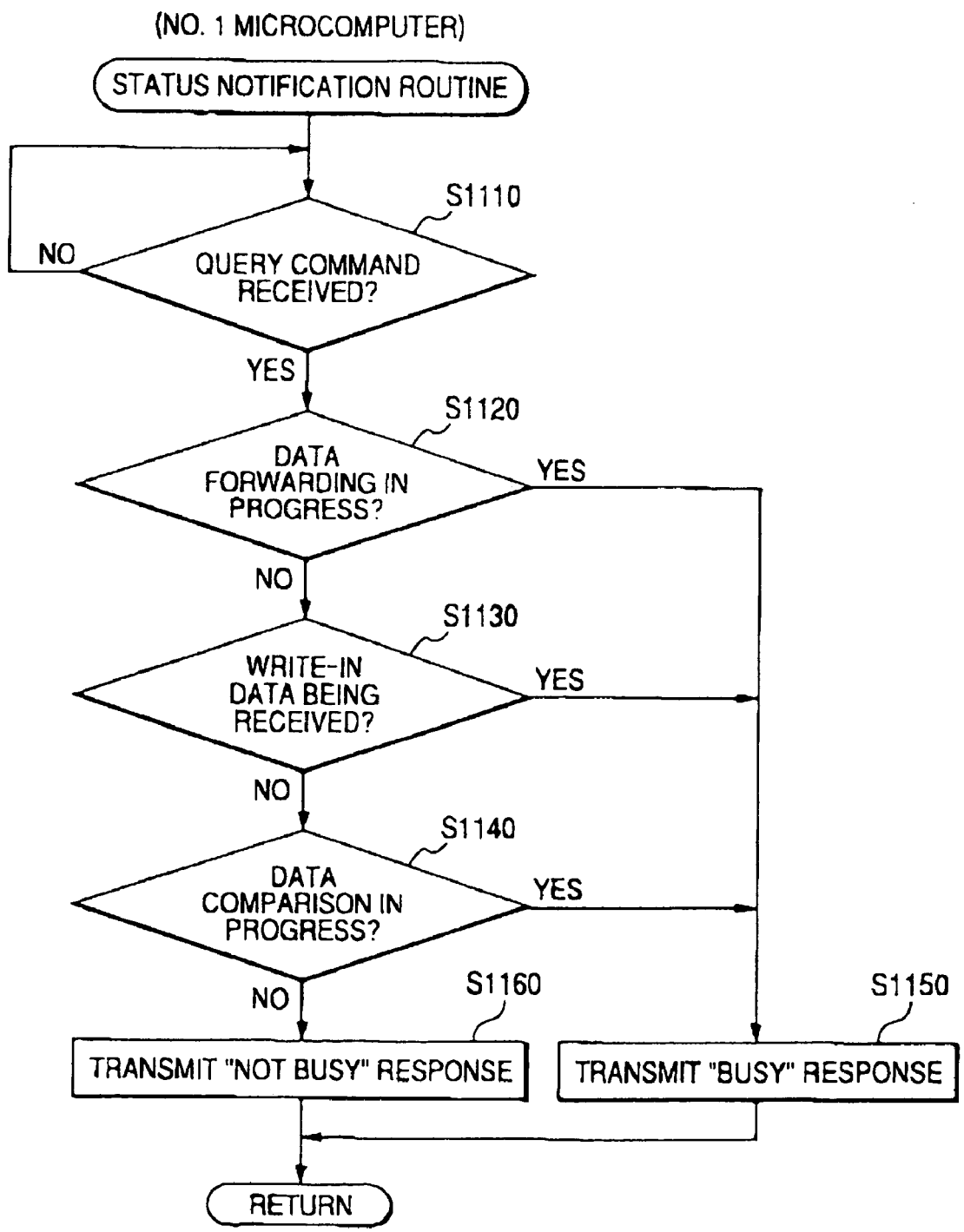
FIG. 14 is a flow diagram of a status notification routine that is executed by the No. 1 microcomputer of the embodiment.

When execution of the initial routine is started, execution of the status notification routine shown in the flow diagram of FIG. 14 is also started, and this is then executed in parallel with the initial routine.

The status notification routine serves to notify the ROM rewrite apparatus 50 of the respective statuses of the No. 1 microcomputer 10 and the No. 2 microcomputer 30, during execution of processing that requires some amount of time to be completed, such as when data are being transferred to the No. 2 microcomputer 30 (which has a low level of processing performance, as described above), or when write-in data are being received by the No. 1 microcomputer 10 from the No. 2 microcomputer 30. The ROM rewrite apparatus 50 is configured such that, when it is transmitting comparison commands, etc., it also transmits query commands, which request the No. 1 microcomputer 10 to supply status information. Specifically, the status information indicates whether the No. 1 microcomputer 10 is in a "busy" status due to processing relating to data forwarding being in progress, i.e., data are being transferred between the No. 1 microcomputer 10 and the No. 2 microcomputer 30, or comparison processing is in progress. Based on responses to these query commands, the ROM rewrite apparatus 50 determines the timings at which to transmit comparison commands, and notifies the user of the status of the forwarding processing.

When the No. 1 microcomputer 10 executes the status notification routine, it first waits to receive a query command from the ROM rewrite apparatus 50, transmitted via the communication circuit 11 (step S1110). When a query command is received, a decision is made as to whether the No. 1 microcomputer 10 is in the process of executing external data transfer processing (step S1120). If such processing is in progress (YES in step S1120), the No. 1 microcomputer 10 transmits a response signal indicating the "busy" status, to the ROM rewrite apparatus 50 (step S1150). This execution of the status notification routine then ends.

However if it is found in step S1120 that external data transfer processing is not in progress, the No. 1 microcomputer 10 executes step S1130, to judge whether the series of steps S1040 to S1067 are being executed, i.e., whether the No. 1 microcomputer 10 is receiving write-in data from the No. 2 microcomputer 30 as described above. If so, operation proceeds to step S1150, to transmit the response signal indicating the "busy" status, to the ROM rewrite apparatus 50. This execution of the status notification routine then ends.

If it is found in step S1130 that receiving of write-in data from the No. 2 microcomputer 30 is not in progress, the No. 1 microcomputer 10 executes step S1140, to judge whether data comparison is in progress (i.e., the series of steps S1070 to S1073 are being executed). If data comparison is in progress, (YES in step S1140), operation proceeds to step S1150, to transmit the response signal indicating the "busy" status, to the ROM rewrite apparatus 50. This execution of the status notification routine then ends.

If it is found in step S1140 that external data comparison processing is not in progress, step S1160 is then executed, to transmit a response signal indicating that the No. 1 microcomputer 10 is in the "not busy" status, to the ROM rewrite apparatus 50. Execution of the status notification routine is then ended.

As a result of repetitively executing the status notification routine, when data transfer between the No. 1 microcomputer 10 and the No. 2 microcomputer 30 has been completed and data comparison processing has been completed, the state of the response signal transmitted to the ROM rewrite apparatus 50 is changed from the "busy" to the "not busy" indication. The ROM rewrite apparatus 50 can thereby determine the appropriate timings for sending comparison commands to the No. 1 microcomputer 10, based on the actual status of the No. 1 microcomputer 10, and can also notify the user of the current statuses of data transfer and data comparison processing.

Next, the rewrite control routine that is executed by the No. 2 microcomputer 30 (in step S450 of the flow diagram of FIG. 7 described above) will be described, referring to the flow diagram of FIG. 15. A receiving and write-in routine that is executed by the No. 2 microcomputer 30 during the execution of the write-in control routine will also be described, referring to the flow diagram of FIG. 16.

In the rewrite control routine, the No. 2 microcomputer 30 first executes initial processing relating to communication (step S1210) then waits to receive a B-type deletion command from the No. 1 microcomputer 10 (step S1220). After the B-type deletion command is received (YES in step S1220), the No. 2 microcomputer 30 receives address data from the No. 1 microcomputer 10, transmitted via the communication circuit 31 (step S1225). The received address data are then analyzed, and the data stored in the region of the ROM 35 that corresponds to the addresses expressed by the address data are then deleted (step S1230). On completion of this data deletion, the No. 2 microcomputer 30 waits to receive a B-type rewrite command from the No. 1 microcomputer 10, transmitted via the communication circuit 31 (step S1240).

When a rewrite command is received (YES in step S1240) the No. 2 microcomputer 30 executes the aforementioned receiving and write-in routine, in which, each time that NM bytes of write-in object data are received from the No. 1 microcomputer 10 via the communication circuit 31, the data are written into the ROM 35 (step S1250).

Specifically, in the receiving and write-in routine, when the No. 2 microcomputer 30 receives NM bytes of write-in object data from the No. 1 microcomputer 10, (YES in step S1251 of FIG. 16), the data are written into the aforementioned region in the ROM 35 from which data have been deleted (starting from the leading address of the part of that region into which new data have not yet been written) (step S1255).

A decision is made as to whether all of the write-in object data (up to the final byte) have been received (step S1257). If not (NO in step S1257), then processing returns to step S1251, to wait to receive another block of NM bytes (transmitted from the No. 1 microcomputer 10 in response to the handshake signal that was transmitted from the No. 2 microcomputer 30 in the preceding execution of step S1255). These received data are then written into the aforementioned region in the ROM 35 from which data have been deleted (starting from the leading address of the part of that region into which new data have not yet been written) (step S1255).

If it is then judged in step S1257 that all of the write-in object data have been received, this execution of the receiving and write-in routine is ended.

When execution of the receiving and write-in routine (step S1250 in FIG. 15) is thus ended, the No. 2 microcomputer 30 moves to step S1260 of the rewrite control routine, and waits to receive a B-type data request command that is transmitted from the No. 1 microcomputer 10 via the communication circuit 31. When the B-type data request command is received (YES in step S1260), the No. 2 microcomputer 30 transmits to the No. 1 microcomputer 10 (in step S1270) NM bytes of the data that were written into a "data deleted" region of the ROM 35, by the preceding execution of the rewrite control routine (S1250) as described above. That is to say, the No. 2 microcomputer 30 reads out NM bytes starting from the leading address of the part of that region from which data have not yet been transmitted to the No. 1 microcomputer 10, and transmits these NM bytes, as rewrite data, via the communication circuit 31 to the No. 1 microcomputer 10.

The No. 2 microcomputer 30 then judges whether all of the rewrite data have been transmitted to the No. 1 microcomputer 10 (step S1280), and if not, operation returns to step S1260, to again wait to receive a B-type data request command from the No. 1 microcomputer 10.

In that way, each time that the No. 1 microcomputer 10 has transmitted NM bytes to the No. 2 microcomputer 30, it waits until the No. 2 microcomputer 30 becomes ready to receive another block of NM bytes, and so transmits the handshake signal to the No. 1 microcomputer 10. When that handshake signal is received, the No. 1 microcomputer 10 again transmits a B-type data request command to the No. 2 microcomputer 30, which at that time is waiting to receive a B-type data request command.

On receiving the B-type detection request, the No. 2 microcomputer 30 transmits NM bytes of the rewrite data (i.e., data previously received and written into the ROM 35 as described above), starting from the leading byte of the rewrite data that have not yet been transmitted to the No. 1 microcomputer 10. If the amount of rewrite data not yet transmitted is less than NM bytes, all of these data art transmitted to the No. 1 microcomputer 10. If all of the rewrite data has been transmitted (YES in step S1280), the No. 2 microcomputer 30 transmits a signal indicating that condition to the No. 1 microcomputer 10, and this execution of the rewrite control routine is ended.

After ending the rewrite control routine, operation of the No. 2 microcomputer 30 in the rewrite mode is continued, and if necessary, processing is again executed starting from S1210.

The present invention has been described above with respect to an embodiment in which the No. 1 microcomputer 10 temporarily stores (in the RAM 17) data that are received from the ROM rewrite apparatus 50. Hence, although the processing performance of the No. 2 microcomputer 30 is insufficient to enable the No. 2 microcomputer 30 to directly receive data at the transfer rate of the ROM rewrite apparatus 50, the No. 1 microcomputer 10 can transfer to the No. 2 microcomputer 30 data that are received by the No. 1 microcomputer 10 from the ROM rewrite apparatus 50, and that are directed (by the ROM rewrite apparatus 50) to the No. 2 microcomputer 30, but with these data being received by the No. 1 microcomputer 10 at the transfer rate of the ROM rewrite apparatus 50.

In that way, data can be transferred from the ROM rewrite apparatus 50 to the No. 2 microcomputer 30 without occurrence of overflow.

To achieve this, with the described embodiment, the No. 1 microcomputer 10 of the ECU 1 operates on data that are to be transferred to the ROM rewrite apparatus 50, to divide these data into successive blocks, each having a size (i.e. NM bytes) that can be transferred directly to the No. 2 microcomputer 30 at one time, without data overflow occurring. Each time the No. 1 microcomputer 10 receives a handshake signal from the No. 2 microcomputer 30, it transfers one of these NM-byte data blocks to the No. 2 microcomputer 30. In that way, reliable data transfer to the No. 2 microcomputer 30 can be achieved, irrespective of the low processing performance of the No. 2 microcomputer 30, so that errors (due to data transfer failures) in data that are written into the ROM of the No. 2 microcomputer 30 can be prevented.

Hence with the above embodiment, even if a low-cost type of microcomputer is utilized as the No. 2 microcomputer 30, the use of the No. 1 microcomputer 10 (i.e., a microcomputer having a sufficiently high processing performance to receive data transferred directly from the ROM rewrite apparatus 50) as a data transfer interface, enables the contents of the ROM of the No. 2 microcomputer 30 to be reliably updated.

Moreover with the ECU 1 described above, when the No. 1 microcomputer 10 receives data from the ROM rewrite apparatus 50 that are directed to the No. 2 microcomputer 30, the No. 1 microcomputer 10 converts these received data into a format that can be interpreted by the No. 2 microcomputer 30, and stores these converted data temporarily in the RAM 17, then subsequently reads out and transmits the converted data to the No. 2 microcomputer 30. Hence, it is unnecessary for the No. 2 microcomputer 30 to have a data conversion function, for processing the data that are generated by the ROM rewrite apparatus 50 into a form whereby the data can be used by the No. 2 microcomputer 30. This further serves to enable a low-cost type of microcomputer to be used as the No. 2 microcomputer 30.

Furthermore with the above embodiment, when the No. 2 microcomputer 30 receives address data (i.e., ROM address data) transmitted from the ROM rewrite apparatus 50 via the No. 1 microcomputer 10 (as in step S1225 described above), the No. 2 microcomputer 30 deletes the contents of the ROM 35 region corresponding to addresses that are specified in the address data (S1230) and thereafter writes the write-in object data (transmitted from the No. 1 microcomputer 10) into that ROM region (step S1250). Hence, with the above embodiment, the No. 2 microcomputer 30 can selectively update any data held in the ROM 35, with a reduced amount of time being required to effect the updating.

Moreover with the above embodiment, when updating of data is performed by the No. 2 microcomputer 30, data which are used in that updating (write-in object data) that are received from the No. 1 microcomputer 10, are thereafter again acquired by the No. 1 microcomputer 10 from the No. 2 microcomputer 30 (S1030 to S1067), and the No. 1 microcomputer 10 compares these write-in data with data received directly from the ROM rewrite apparatus 50 (i.e., which should be identical to the write-in data received from the No. 2 microcomputer 30) as comparison data (S1070 to S1073), and transmits the comparison results via the communication circuit 11 to the ROM rewrite apparatus 50 (S1075 to S1077).

Hence with the above embodiment, the ROM rewrite apparatus 50 can determine whether any errors have occurred in the process of forwarding data from the No. 1 microcomputer 10 to the No. 2 microcomputer 30, based on the comparison results. Moreover if the comparison results show that the data do not match, then the user can re-execute the updating operation. It can thereby be ensured that updating of data stored in ROM at the No. 2 microcomputer 30 can be performed accurately and reliably.

Moreover with the above embodiment, when the No. 1 microcomputer 10 receives a query command (sent from the ROM rewrite apparatus 50 via the communication circuit 11), it judges whether or not data transfer processing or data comparison processing is being performed, and sends a response signal indicative of the results of that judgement to the ROM rewrite apparatus 50 via the communication circuit 11 (i.e., by executing the status notification routine described hereinabove). Hence the ROM rewrite apparatus 50 can be kept notified of the current "busy" or "not busy" status of the No. 1 microcomputer 10, and so can send commands to the No. 1 microcomputer 10 without unnecessary delay, since a command can be transmitted to the No. 1 microcomputer 10 as soon as the ROM rewrite apparatus 50 learns that the No. 1 microcomputer 10 has entered the "not busy" status.

Furthermore, the ROM rewrite apparatus 50 can notify the user of the data transfer status, so that the user can readily grasp the extent to which processing has advanced.

It should be noted that although the invention has been described referring to a specific embodiment, various modifications or alternative configurations could be envisaged, which fall within the scope claimed for the invention as set out in the appended claims.

What is claimed is:

1. An electronic control apparatus comprising a first microcomputer coupled to an external apparatus via an external communication line and a second microcomputer coupled to said first microcomputer via an internal communication line, each of said first microcomputer and second microcomputer comprising an internally disposed rewritable type of non-volatile memory, said first microcomputer comprising a first communication circuit connected to said external communication line and to said internal communication line, and said second microcomputer comprising a second communication circuit connected to said internal communication line, each of said first microcomputer and second microcomputer performing processing based upon data stored in said non-volatile memory thereof, and said first microcomputer and second microcomputer being responsive to write-in data that are directed thereto, transmitted from said external apparatus and received via said first communication circuit, for writing said write-in data into said non-volatile memory thereof, to update said data stored in said non-volatile memory thereof;

wherein:

said first microcomputer further comprises a volatile memory and storage control circuitry configured to store, in said volatile memory, data that are directed to said second microcomputer and are received from said external apparatus via said external communication line, and data forwarding circuitry configured to read out said data from said volatile memory and transmit said data to said second microcomputer via said internal communication line at a rate determined in accordance with a data receiving performance of said second microcomputer;

said second microcomputer receives said data transmitted by said data forwarding circuitry as write-in data, to be written into said non-volatile memory of said second microcomputer; and wherein said first microcomputer comprises acquisition circuitry configured to acquire, from said second microcomputer via said internal communication line, previously-written data that have been previously received by said second microcomputer and written into said non-volatile memory of said second microcomputer, and to acquire data corresponding to said previously-written data from said external apparatus, comparator circuitry configured to compare said previously-written data with said corresponding data, and comparison result notification circuitry configured to transmit notification information concerning results of said comparison performed by said comparator circuitry, to said external apparatus via said external communication line.

2. An electronic control apparatus according to claim 1, wherein said data forwarding circuitry is configured to divide said data directed to said second microcomputer into a plurality of data blocks and successively transmit said data blocks to said second microcomputer, and wherein a maximum size for each of said data blocks is predetermined based upon said data receiving processing capability of said second microcomputer.

3. An electronic control apparatus according to claim 2, wherein said second microcomputer transmits a handshake signal to said first microcomputer each time that a specific data acquisition status is attained by said second microcomputer, and wherein said data forwarding circuitry of said first microcomputer is configured to successively transmit said data blocks in response to successive occurrences of said handshake signal.

4. An electronic control apparatus according to claim 1, wherein said first microcomputer comprises data conversion circuitry configured to operate on said data that are directed to said second microcomputer, to convert said data into a format capable of interpretation by said second microcomputer, and wherein said data forwarding circuit is configured to transmit said data to said second microcomputer after said conversion has been performed.

5. An electronic control apparatus according to claim 1, wherein:

said first microcomputer receives said data directed to said second microcomputer together with corresponding address information, and said data forwarding circuitry is configured to transmit said data together with said address information to said second microcomputer, and said second microcomputer receives said data as write-in data, and writes said write-in data into a specific region of said non-volatile memory, with said specific region being specified by said address information.

6. An electronic control apparatus according to claim 1, wherein said first microcomputer is responsive to receiving a transfer status notification command transmitted from said external apparatus via said external communication line for transmitting, to said external apparatus, information indicative of an operating status of said data forwarding circuitry.

* * * * *